United States Patent
Yang et al.

(10) Patent No.: US 11,277,864 B2
(45) Date of Patent: *Mar. 15, 2022

(54) METHOD AND APPARATUS FOR DETERMINING LBT MODE AND METHOD FOR LBT MODE SWITCHING

(71) Applicant: ZTE Corporation, Guangdong (CN)

(72) Inventors: Ling Yang, Guangdong (CN); Wei Gou, Guangdong (CN); Focai Peng, Guangdong (CN); Feng Bi, Guangdong (CN); Yajun Zhao, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 96 days.

This patent is subject to a terminal disclaimer.

(21) Appl. No.: 16/877,465

(22) Filed: May 18, 2020

(65) Prior Publication Data

US 2020/0281019 A1 Sep. 3, 2020

Related U.S. Application Data

(63) Continuation of application No. 15/934,996, filed on Mar. 24, 2018, now Pat. No. 10,660,127, which is a (Continued)

(30) Foreign Application Priority Data

Sep. 25, 2015 (CN) .......................... 201510622363.3

(51) Int. Cl.
*H04W 4/00* (2018.01)
*H04W 74/08* (2009.01)
(Continued)

(52) U.S. Cl.
CPC ....... *H04W 74/0808* (2013.01); *H04W 16/14* (2013.01); *H04W 72/042* (2013.01);
(Continued)

(58) Field of Classification Search
CPC ... H04W 28/04; H04W 72/04; H04W 72/042; H04W 88/08; H04W 74/0808;
(Continued)

(56) References Cited

U.S. PATENT DOCUMENTS 10,009,153 B2 6/2018 Nory et al.
10,375,579 B2 8/2019 Li et al.
(Continued)

FOREIGN PATENT DOCUMENTS

CN 104333873 A 2/2015
CN 104539405 A 4/2015
(Continued)

OTHER PUBLICATIONS

3GPP, Alcatel-Lucent Shanghai Bell, Alcatel-Lucent, "UL LBT and DL/UL Frame Structure for LAA," 3GPP TSG RAN WG1 Meeting #82, Beijing, China, R1-154574, 6 pages, Aug. 2015.
(Continued)

*Primary Examiner* — Phuongchau Ba Nguyen
(74) *Attorney, Agent, or Firm* — Perkins Coie LLP

(57) ABSTRACT

The present disclosure provides a method and an apparatus for determining a Listen Before Talk (LBT) mode, as well as a method for LBT mode switching. The method includes: determining (100) an LBT mechanism and/or an LBT mechanism parameter set based on related indication information and/or priority information and/or measurement information; and performing (101), by a transmitting device, contention-based channel access based on the determined LBT mechanism and/or LBT mechanism parameter set. With the present disclosure, an LBT mode can be determined. With the selection of the LBT mode, it is possible to avoid waste of channel resources and indication information due to an improper LBT mode, thereby improving an efficiency of contention-based channel access.

12 Claims, 2 Drawing Sheets

---

100

Determine an LBT mechanism and/or an LBT mechanism parameter set based on related indication information and/or priority information and/or measurement information

101

Perform, by a transmitting device, contention-based channel access based on the determined LBT mechanism and/or LBT mechanism parameter set

Related U.S. Application Data continuation of application No. PCT/CN2016/099932, filed on Sep. 23, 2016.

(51) Int. Cl.
*H04W 16/14* (2009.01)
*H04W 76/27* (2018.01)
*H04W 72/04* (2009.01)
*H04W 72/12* (2009.01)

(52) U.S. Cl.
CPC ....... *H04W 72/0446* (2013.01); *H04W 76/27* (2018.02); *H04W 72/1289* (2013.01)

(58) Field of Classification Search
CPC . H04W 16/14; H04W 72/0446; H04W 76/27; H04W 72/1289; H04W 74/0833; H04W 74/0875; H04W 72/0413; H04W 72/1268; H04W 74/006; H04W 72/044; H04W 72/12; H04W 72/14; H04W 74/0816; H04W 24/02; H04W 72/0406; H04W 72/0453; H04W 72/085; H04W 72/1236; H04W 72/1284; H04W 74/08; H04W 74/0825; H04W 74/085; H04L 5/0007; H04L 25/0228; H04L 27/0006; H04L 27/2692; H04L 5/001; H04L 5/0039; H04L 5/0044; H04L 5/0048; H04L 5/0051; H04L 12/413; H04L 12/403; H04L 12/417; H04L 25/49

See application file for complete search history.

(56) References Cited

U.S. PATENT DOCUMENTS

| | | | |
|---|---|---|---|
| 10,660,127 B2 * | 5/2020 | Yang | H04W 16/14 |
| 10,863,543 B2 * | 12/2020 | Lei | H04L 5/006 |
| 10,880,922 B2 * | 12/2020 | Koorapaty | H04W 74/0808 |
| 10,945,287 B2 * | 3/2021 | Sun | H04L 5/0053 |
| 2015/1063824 | 6/2015 | Krzymien et al. | |
| 2016/0143014 A1 | 5/2016 | Mukherjee et al. | |
| 2017/0111874 A1 * | 4/2017 | Harada | H04W 52/143 |
| 2017/0332395 A1 * | 11/2017 | Yin | H04W 72/1268 |
| 2017/0359808 A1 * | 12/2017 | Dinan | H04L 5/0053 |
| 2018/0317246 A1 | 11/2018 | Mukherjee et al. | |
| 2019/0014596 A1 | 1/2019 | Yang et al. | |
| 2019/0123850 A1 * | 4/2019 | Dinan | H04L 1/0075 |
| 2019/0150170 A1 * | 5/2019 | Park | H04W 74/08 370/329 |
| 2019/0166617 A1 * | 5/2019 | Park | H04W 72/1289 |
| 2020/0187251 A1 * | 6/2020 | Noh | H04W 74/0808 |
| 2021/0058954 A1 * | 2/2021 | Li | H04W 72/1289 |

FOREIGN PATENT DOCUMENTS

| | | |
|---|---|---|
| CN | 104581908 A | 4/2015 |
| CN | 104717687 A | 6/2015 |
| CN | 104812032 A | 7/2015 |
| WO | 2013/086659 A1 | 6/2013 |
| WO | 2014/197307 | 12/2014 |
| WO | 2017/196053 A2 | 11/2017 |

OTHER PUBLICATIONS

3GPP, Ericsson, Huawei, "RAN1 Agreements, Working Assumptions and Conclusions for Rel-14 Enhanced LAA," 3GPP TSG RAN WG1 Meeting #85, Nanjing, China, R1-166049, 14 pages, May 2015.

European Search Report dated Mar. 21, 2019 for European Application No. 16848162.0, filed on Sep. 23, 2016 (9 pages).

International Search Report and Written Opinion dated Dec. 13, 2016 for International Application No. PCT/CN2016/099932, filed on Sep. 23, 2016 (18 pages).

CMCC, "Discussion on issues related to UL channel access for LAA," 3GPP TSG RAN WG1 Meeting #82, Beijing, China, R1-154295,4 pages, Aug. 2015.

Communication pursuant to Article 94(3) EPC dated Feb. 28, 2020 for European Application No. 16848162.0, filed on Sep. 23, 2016 (6 pages).

Communication pursuant to Article 94(3) EPC dated Sep. 28, 2020 for European Application No. 16848162.0, filed on Sep. 23, 2016 (5 pages).

Decision of Patent dated Jan. 12, 2021, for Japanese Patent Application No. 2018-515506, filed on Sep. 23, 2016 (4 pages).

InterDigital Communications, "UL HARQ operation for LAA," 3GPP TSG-RAN WG1 Meeting #80bis, Belgrade, Serbia, R1-151936,2 pages, Apr. 2015.

Japanese Office Action dated Sep. 15, 2020 for Japanese Patent Application No. 2018-515506, filed on Sep. 23, 2016 (11 pages).

LG Electronics, "LBT operation for LAA," 3GPP TSG RAN WG1 Ad-hoc Meeting, Paris, France, R1-151080, 11 pages, Mar. 2015.

Chinese Office Action dated Mar. 29, 2021 for Chinese Patent Application No. 201510622363.3, filed on Sep. 25, 2015 (21 pages).

Communication pursuant to Article 94(3) EPC dated Apr. 20, 2021 for European Application No. 16848162.0, filed on Sep. 23, 2016 (6 pages).

Interdigital Communications, "On the LAA channel access framework," 3GPP TSG-RAN WG1 Meeting #82, Beijing, China, R1-154485, 3 pages, Aug. 28, 2015.

Korean Office Action dated Mar. 29, 2021 for Korean Patent Application No. 10-2018-7011 599, filed on Sep. 23, 2016 (9 pages).

Korean Office Action dated Oct. 25, 2021 for Korean Patent Application No. 10-2018-7011599, filed on Sep. 23, 2016 (6 pages).

* cited by examiner

METHOD AND APPARATUS FOR DETERMINING LBT MODE AND METHOD FOR LBT MODE SWITCHING

CROSS REFERENCE TO RELATED APPLICATIONS

This patent document is a continuation of and claims the benefit of priority to U.S. patent application Ser. No. 15/934,996, filed on Mar. 24, 2018, which is a continuation of International Patent Application No. PCT/CN2016/099932, filed on Sep. 23, 2016, which claims the benefit of priority of Chinese Patent Application No. 201510622363.3, filed on Sep. 25, 2015. The entire contents of the before-mentioned patent applications are incorporated by reference as part of the disclosure of this application.

TECHNICAL FIELD

The present disclosure relates to wireless communication technology, and more particularly, to a method and an apparatus for Listen Before Talk (LBT) mode switching.

BACKGROUND

With the rapid growth of data traffic, there are increasingly higher data transmission loads on carriers in licensed spectrums. Hence, it is an importation trend of evolution in the future development of Long Term Evolution (LTE) to offload the data traffic on the licensed carriers to carriers in unlicensed spectrums. The unlicensed spectrums have several advantages. People do not need to buy them—their spectrum resources are free or inexpensive. They have low admission requirements so both individuals and companies can deploy them. They include frequency bands at 5 GHz and 2.4 GHz and have a large bandwidth available. They have a characteristic of resource sharing, allowing several different systems or several different operators of one single system to operate therein, such that the spectrum utilization efficiency can be improved by means of resource sharing.

In view of the above advantages of the unlicensed spectrums, the LTE Release 13 has started a research since September 2014, including an important research topic regarding operations of the LTE system using carriers in the unlicensed spectrums. The techniques involved in this topic enable the LTE system to use the currently existing carriers in the unlicensed spectrums, so as to increase the potential spectrum resources of the LTE system significantly, allowing the LTE system to have a further reduced cost of spectrum resources. While bringing benefits for the development of the LTE system, the use of the carrier resources in the unlicensed spectrum causes a problem of fair coexistence between a Licensed-Assisted Access (LAA) system and other communication techniques (e.g., Wi-Fi). In addition, according to regulations in some areas, in order to access carriers in the unlicensed spectrum, a Listen Before Talk (LBT) mechanism is required to be performed first. That is, an LAA device, such as an evolved NodeB and/or a User Equipment (UE), has to fulfil the LBT requirement in those areas, in order to coexist friendly with other communication techniques (e.g., Wi-Fi).

With further researches in the LTE-U topic in the R13 LAA SI stage, finally in the first meeting of the WI stage (3GPP RAN1 #82), it has been agreed as to whether a UE needs to apply the LBT mechanism before an uplink transmission. That is, it is believed that the UE must apply the LBT mechanism individually before transmission, so as to improve the uplink performance of the system. Meanwhile, there are several types of candidate modes available for the uplink LBT and there are different configurations in on mode. Here, the candidates of uplink LBT modes include: LBT Category (Cat) 2, an LBT mechanism without random back-off; LBT Cat3, an LBT mechanism with random back-off and a fixed Contention Window (CW) size; and LBT Cat4, an LBT mechanism with random back-off and a variable CW size. Further, depending on different priority levels or requirements, some set of parameters for some LBT mechanism may be needed.

Hence, while some operational assumptions have been agreed currently for the LAA uplink, there are no solutions defined for switching between the candidates of the uplink LBT modes or between different sets of configuration parameters in one LBT mode. If an improper LBT mode is selected, e.g., when only one configured LBT mode or parameter set is adopted in an uplink system, its performance will be degraded. Furthermore, if an improper LBT mode is configured, there may be problems such as waste of resources allocated to a UE, waste of uplink indication information, low contention-based access rate, or unfairness.

SUMMARY

In order to solve the above problems, the embodiments of the present disclosure provide a method and an apparatus for LBT mode switching, which clearly defines an LBT mode for contention-based channel access and is capable of avoiding problems due to improper selection of LBT mode.

The object of the present disclosure is achieved by providing a method for Listen Before Talk (LBT) mode switching. The method includes: determining an LBT mechanism and/or an LBT mechanism parameter set based on related indication information and/or priority information and/or measurement information.

Optionally, the method further includes: performing, by a transmitting device, contention-based channel access based on the determined LBT mechanism and/or LBT mechanism parameter set.

Optionally, the related indication information includes: a size of data packet to be transmitted, a number of successive scheduled subframes, one or more bits configured in physical Downlink Control Information (DCI) signaling, a broadcast scheme, a time-domain length of a gap between an uplink transmission burst and a downlink transmission burst, an identity in an LBT list signaled from a base station, a position of a scheduled subframe in a transmission burst or in successive uplink subframes, a length of one transmission burst, and/or a carrier scenario for transmission of a scheduling instruction.

Optionally, the priority information includes: a Quality of Service (QoS) priority for a traffic type, or a priority of a channel, a priority of a signal, a priority of a logical channel, and/or the priorities of the channel, signal and logical channel.

Optionally, the priority information further includes: a priority of a physical transmission channel, obtained by mapping a level of the priority of the logical channel to the physical transmission channel.

Optionally, the measurement information includes: Channel State Information (CSI) within a predetermined time length, a Reference Signal Received Power (RSRP) within a predetermined time length, a Reference Signal Received Quality (RSRQ) within a predetermined time length, Hybrid Automatic Repeat reQuest—Acknowledge (HARQ-ACK) information, or information on a measured interference.

Optionally, the LBT mechanism includes an LBT mechanism without random back-off and an LBT mechanism with random back-off.

Optionally, the LBT mechanism without random back-off includes an LBT Cat2 mechanism and an enhanced LBT Cat2 mechanism.

Optionally, the LBT Cat2 mechanism is an LBT mechanism in which only one Clear Channel Assessment (CCA) is performed.

Optionally, the enhanced LBT Cat2 mechanism is an LBT mechanism in which two or more Clear Channel Assessments (CCAs) are performed.

Optionally, each CCA has a fixed or random start position.

Optionally, each CCA has a time length of 34 microseconds (μs), 25 μs, 20 μs, 16 μs, 9 μs or 4 μs.

Optionally, the LBT mechanism with random back-off includes an LBT Cat4 mechanism having a variable Contention Window (CW) size and an LBT Cat3 mechanism having a fixed CW size.

Optionally, the LBT Cat4 mechanism includes at least one of the following parameters: a first Clear Channel Assessment (CCA); a defer period; a maximum CW, CWmax; a minimum CW, CWmin; and a random back-off value, N.

Optionally, the defer period includes defer time plus n multiplied by slot, or n multiplied by slot plus defer time, where n is an integer in an interval of [0, 2], slot has a time-length of 9 μs, and the defer time is 16 μs.

Optionally, the first CCA has a time length of 34 microseconds μs), 25 μs, 20 μs, 16 μs, 9 μs or 4 μs.

Optionally, the random back-off value N is indicated by a base station, generated randomly or predetermined.

Optionally, the random back-off value N is a value selected randomly from an interval of [0, q−1], where q is a value selected randomly from an interval of [CWmin, CWmax].

Optionally, the LBT mechanism parameter set includes: when the LBT mechanism is an LBT Cat4 mechanism, at least one of: a minimum CW; a maximum CW; and a component n of a defer period, for the LBT Cat4 mechanism; or when the LBT mechanism is an LBT Cat2 mechanism, a time length of a Clear Channel Assessment (CCA) for the LBT Cat2 mechanism.

Optionally, when the LBT mechanism is the LBT Cat4 mechanism, the mechanism parameter set further includes: a time length of a first CCA.

Optionally, the method further includes, when the LBT mechanism is the LBT Cat4 mechanism: dividing the LBT mechanism parameter set into respective categories depending on different values of the maximum CW and the minimum CW and/or a size of the component n in the defer period in the parameter set for the LBT Cat4. The respective categories of the LBT mechanism parameter set can have their respective CW intervals, corresponding to their respective maximum CWs and minimum CWs, partially overlapping or not overlapping each other.

Optionally, the method further includes, when the LBT mechanism is the LBT Cat2 mechanism: dividing the LBT mechanism parameter set into respective categories depending on different time lengths of CCA for the LBT Cat2.

Optionally, the method further includes, when the LBT mechanism includes the LBT Cat2 and the LBT Cat4: dividing the LBT mechanism parameter set into respective categories depending on different time lengths of CCA, sizes of CWs and/or components n in the defer period.

Optionally, the respective categories of the LBT mechanism parameter set are based on priorities, predefined, divided based on values of available maximum CWs, divided based on time lengths of CCA, indicated by a base station, or indicated dynamically in Downlink Control Information (DCI).

Optionally, when the related indication information is a size of data packet to be transmitted, the operation of determining the LBT mechanism and/or LBT mechanism parameter set based on the related indication information includes: preconfiguring a set of sizes for data to be transmitted corresponding to respective LBT mechanisms and/or LBT mechanism parameter sets; and selecting the LBT mechanism and/or LBT mechanism parameter set corresponding to the size of data packet to be transmitted.

When the switching related information is a number of successive scheduled subframes, the operation of determining the LBT mechanism and/or LBT mechanism parameter set based on the related indication information includes: preconfiguring a set of for numbers of successive scheduled subframes corresponding to the respective LBT mechanisms and/or LBT mechanism parameter sets; and selecting the LBT mechanism and/or LBT mechanism parameter set corresponding to the number of successive scheduled subframes.

When the switching related information is one or more bits configured in Downlink Control Information (DCI) signaling, the operation of determining the LBT mechanism and/or LBT mechanism parameter set based on the related indication information includes: preconfiguring a set of bit information and/or numbers of bits configured in the DCI signaling corresponding to the respective LBT mechanisms and/or LBT mechanism parameter sets; and selecting the LBT mechanism and/or LBT mechanism parameter set corresponding to the bit information and/or the number of bits configured in the DCI signaling for contention-based channel access.

When the switching related information is a broadcast scheme, the operation of determining the LBT mechanism and/or LBT mechanism parameter set based on the related indication information includes: determining the LBT mechanism and/or LBT mechanism parameter set based on an identity in an LBT list set, a category of an LBT mechanism parameter set, an LBT mechanism and/or an LBT mechanism parameter set broadcasted to a transmitting device.

When the switching related information is a time-domain length of a gap between an uplink burst and a downlink burst, the operation of determining the LBT mechanism and/or LBT mechanism parameter set based on the related indication information includes: preconfiguring a set of time-domain lengths for the gaps corresponding to the respective LBT mechanisms and/or LBT mechanism parameter sets; and determining the LBT mechanism and/or LBT mechanism parameter set corresponding to the time-domain length of the gap between the uplink burst and the downlink burst.

When the switching related information is an identity in an LBT list signaled from a base station, the operation of determining the LBT mechanism and/or LBT mechanism parameter set based on the related indication information includes: preconfiguring an information list of LBT mechanisms for switching, to be shared between that transmitting device and the base station; and determining, by the transmitting device, the LBT mechanism and/or LBT mechanism parameter set based on an identity in the information list as indicated or broadcasted by the base station.

When the related indication information is a position of a scheduled subframe in a transmission burst or in successive uplink subframes, the operation of determining the LBT mechanism and/or LBT mechanism parameter set based on the related indication information includes: preconfiguring positions of the scheduled subframe in the transmission burst or positions of the scheduled subframe in the successive uplink subframes corresponding to respective LBT mechanisms and/or LBT mechanism parameter sets; and determining the LBT mechanism and/or LBT mechanism parameter set based on the position of the scheduled subframe in the transmission burst or in the successive uplink subframes.

When the related indication information is a carrier scenario for transmission of a scheduling instruction, the operation of determining the LBT mechanism and/or LBT mechanism parameter set based on the related indication information includes: determining the LBT mechanism and/or LBT mechanism parameter set based on same-carrier scheduling or cross-carrier scheduling.

Optionally, the method further includes, when the switching related information is a time-domain length of a gap between an uplink burst and a downlink burst: preconfiguring a set of time-domain lengths for the gaps corresponding to respective LBT mechanisms and/or LBT mechanism parameter sets; and determining to apply no LBT mechanism and/or LBT mechanism parameter set when the time-domain length of the gap between the uplink burst and the downlink burst is smaller than a predetermined threshold.

Optionally, the operation of determining the LBT mechanism and/or LBT mechanism parameter set based on the related indication information and the priority information includes: determining the LBT mechanism based on the related indication information, and then determining the LBT mechanism parameter set corresponding to the LBT mechanism based on different priority levels in the priority information.

Optionally, the operation of determining the LBT mechanism parameter set corresponding to the LBT mechanism based on different priority levels in the priority information includes: determining a corresponding LBT mechanism, LBT mechanism parameter set or category of LBT mechanism parameter set based on different priorities contained in the priority information in accordance with a predetermined correspondence. The priority information includes a Quality of Service (QoS) priority for a traffic type, a priority of a channel, a priority of a signal, and/or a priority of a logical channel.

Optionally, the method further includes, subsequent to determining the corresponding LBT mechanism, LBT mechanism parameter set or category of LBT mechanism parameter set in accordance with the predetermined correspondence: determining more specific parameters for the LBT mechanism based on the related indication information.

Optionally, the method further includes, when performing contention-based channel access based on the determined LBT mechanism and/or LBT mechanism parameter set: selecting, when the contention-based access has failed once, an LBT mechanism and/or an LBT mechanism parameter set corresponding to a higher priority level based on the priority information for subsequent contention-based channel access; selecting, when the contention-based access has succeeded once, an LBT mechanism and/or an LBT mechanism parameter set corresponding to a lower priority level based on the priority information for subsequent contention-based channel access; selecting, when the contention-based access based on the LBT mechanism and/or LBT mechanism parameter set has failed for a first predetermined threshold number of times, an LBT mechanism parameter set having a smaller Contention Window (CW) size and/or a shorter time length of Clear Channel Assessment (CCA), or a more simplified or faster LBT mechanism for contention-based channel access; or selecting, when the contention-based access based on the LBT mechanism and/or LBT mechanism parameter set has succeeded for a second predetermined threshold number of times, an LBT mechanism parameter set having a larger CW size and/or a longer time length of CCA, or a more complicated LBT mechanism for contention-based channel access. The first predetermined threshold number and the second first predetermined threshold number are predefined, obtained based on statistics, or indicated by a base station.

Optionally, the method further includes: selecting different LBT mechanisms and/or LBT mechanism parameter sets for an initial transmission and a retransmission.

Optionally, the operation of selecting different LBT mechanisms and/or LBT mechanism parameter sets for the initial transmission and the retransmission includes: determining the LBT mechanism and/or LBT mechanism parameter set for the retransmission such that, when compared with the LBT mechanism and/or LBT mechanism parameter set selected for the initial transmission, a different LBT mechanism or the same LBT mechanism with a smaller Contention Window (CW) size and/or a shorter time length of Clear Channel Assessment (CCA) is determined for the retransmission.

Optionally, for a plurality of successive uplink subframes, the operation of determining the LBT mechanism and/or LBT mechanism parameter set includes: determining to use the same LBT mechanism or LBT mechanism parameter set or different LBT mechanisms or LBT mechanism parameter sets for the respective uplink subframes.

Optionally, for same-carrier scheduling and for the plurality of successive uplink subframes, the operation of determining to use different LBT mechanisms or LBT mechanism parameter sets for the respective uplink subframes includes: determining, before the first uplink subframe is transmitted, to use a fast LBT mechanism and LBT mechanism parameter set for fast contention-based channel access; and determining, for each of subsequent uplink subframes, to use a faster LBT mechanism and LBT mechanism parameter set than the LBT mechanism and LBT mechanism parameter set used for the previous uplink subframe, for fast contention-based channel access. The fast LBT mechanism or LBT mechanism parameter set determined for the first uplink subframe is configured with a number of Orthogonal Frequency Division Multiplexing (OFDM) symbols.

Optionally, the method further includes, for same-carrier scheduling, when it is determined, before the first uplink subframe is transmitted, to use the fast LBT mechanism and LBT mechanism parameter set for fast contention-based channel access: determining, for each of subsequent uplink subframes, not to use any LBT mechanism and LBT mechanism parameter set for fast contention-based channel access.

Optionally, for same-carrier scheduling and for the plurality of successive uplink subframes, the operation of determining to use the same LBT mechanism or LBT mechanism parameter set for the respective uplink subframes includes: determining, before the first uplink subframe is transmitted, to use a fast LBT mechanism and LBT mechanism parameter set for fast contention-based channel access; and determining, for each of subsequent uplink subframes, to use the same LBT mechanism and LBT mechanism parameter set as the LBT mechanism and LBT mechanism parameter set used for the first uplink subframe, for fast contention-based channel access. The fast LBT mechanism and LBT mechanism parameter set determined for the first uplink subframe are configured with a number of Orthogonal Frequency Division Multiplexing (OFDM) symbols, and the fast LBT mechanism and LBT mechanism parameter set determined for each of the subsequent uplink subframes are configured with one OFDM symbol.

Optionally, the fast LBT mechanism and LBT mechanism parameter set include at least one of: an LBT Cat4 mechanism having a maximum Contention Window (CW) smaller than a CW for a downlink LBT Cat4, or a defer period plus Extended Clear Channel Assessment (ECCA) process, a direct ECCA, an enhanced LBT Cat2 and an LBT Cat2.

Optionally, for cross-carrier scheduling and for the plurality of successive uplink subframes, the operation of determining to use different LBT mechanisms or LBT mechanism parameter sets for the respective uplink subframes includes: determining, before the first uplink subframe is transmitted, to use a normal LBT Cat4 mechanism when no data is to be transmitted in downlink and uplink grant information is transmitted over a licensed carrier; and determining, for each of subsequent uplink subframes, to use a LBT Cat4 mechanism having a smaller Contention Window (CW) than the LBT Cat4 mechanism used for the previous uplink subframe, or a more simplified LBT mechanism.

Optionally, the normal LBT Cat4 mechanism determined for the first uplink subframe is configured with a number of Orthogonal Frequency Division Multiplexing (OFDM) symbols, and the LBT Cat4 mechanism or the more simplified LBT mechanism determined for each of the subsequent uplink frames is configured with one OFDM symbol.

Optionally, the method further includes, when all subframes are uplink subframes: using the first uplink subframe as a position for applying the LBT mechanism and/or LBT mechanism parameter set before the second uplink subframe; and using, for each of subsequent uplink subframes, the last Orthogonal Frequency Division Multiplexing (OFDM) symbol of the previous uplink subframe as a position for applying the LBT mechanism and/or LBT mechanism parameter set for that uplink subframe.

Optionally, the method further includes, for a plurality of successive uplink subframes: obtaining, by the transmitting device, a position of an uplink subframe in a transmission burst or applying the LBT mechanism and/or LBT mechanism parameter set by:

for a fixed frame structure:
applying, by the transmitting device, the LBT mechanism and/or LBT mechanism parameter set based on a position of a subframe in which it is scheduled, in accordance with a predefined rule, or for a flexible uplink/downlink subframe structure:
notifying, by a base station, to the transmitting device explicitly via an indication message whether a scheduled subframe is the first subframe or a subframe that is a particular number of subframes behind the first subframe, or indicating, by the base station, to the transmitting device via dynamic Downlink Control Information (DCI) the LBT mechanism and/or LBT mechanism parameter set to be applied on the scheduled subframe.

Optionally, the method further includes, when there is a plurality of different priority levels in a burst transmitted from a transmitted device: performing contention-based channel access in accordance with a predetermined LBT policy.

Optionally, the LBT mechanism or LBT mechanism parameter set is obtained by one of: determining the LBT mechanism or LBT mechanism parameter set based on information on a subframe in which a User Equipment (UE) is scheduled, determining the LBT mechanism or LBT mechanism parameter set based on Downlink Control Information (DCI) signaling transmitted from a base station to the UE, or determining the LBT mechanism or LBT mechanism parameter set based on higher layer Radio Resource Control (RRC) signaling.

Optionally, the information on the subframe in which the UE is scheduled is determined based on physical layer DCI signaling.

Optionally, for a plurality of uplink subframes or when a plurality of successive subframes is scheduled:
an LBT Cat4 is applied on the first uplink subframe and an LBT Cat2 is applied on a plurality of subsequent uplink subframes,
the LBT Cat2 is applied on the first uplink subframe and the LBT Cat2 is applied on a plurality of subsequent uplink subframes,
the LBT Cat4 is applied on the first uplink subframe and the LBT Cat4 is applied on a plurality of subsequent uplink subframes,
the LBT Cat4 is applied on the first uplink subframe and, for each of a plurality of subsequent uplink subframes, a smaller Contention Window (CW) is applied than the previous subframe,
the LBT Cat4 is applied on the first uplink subframe and no LBT is applied on a plurality of subsequent uplink subframes, or
the LBT Cat2 is applied on the first uplink subframe and no LBT is applied on a plurality of subsequent uplink subframes.

Optionally, for a plurality of uplink subframes or when a plurality of successive subframes is scheduled:
when an LBT has succeeded on an uplink subframe, no LBT is applied on subsequent uplink subframes,
when an LBT has succeeded on an uplink subframe, an LBT is applied on subsequent uplink subframes in accordance with an LBT mechanism or LBT mechanism parameter set signaled by a base station,
when an LBT has failed on an uplink subframe, an LBT is applied on the next uplink subframe in accordance with the same LBT mechanism or LBT mechanism parameter set as the one applied on that uplink subframe,
when an LBT has failed on an uplink subframe, an LBT is applied on the next uplink subframe in accordance with an LBT mechanism or LBT mechanism parameter set configured by the base station,
when an LBT has failed on an uplink subframe, an LBT is applied on the next uplink subframe in accordance with a preconfigured LBT mechanism or LBT mechanism parameter set, or
when an LBT has failed on an uplink subframe, an LBT is applied on the next uplink subframe in accordance with a default LBT mechanism or LBT mechanism parameter set.

Optionally, the method further includes, when a User Equipment (UE) has failed successively for a number of times in accessing a channel in accordance with a configured LBT mechanism or LBT mechanism parameter set: adjusting an LBT priority, the LBT mechanism or the LBT mechanism parameter set based on one of:
an indication signaled by a base station,
a measurement of feedback information,
a measurement of interference condition, or a priority of at least one of: a transmitted channel, a transmitted signal, a transmitted logical channel, or a type of transmitted traffic.

Optionally, an Information Element (IE) field for indicating the LBT mechanism or LBT mechanism parameter set is added in the physical layer DCI signaling or the higher layer RRC signaling. The IE field uses n bits, where n is an integer larger than or equal to 1.

In another aspect, an apparatus for determining a Listen Before Talk (LBT) mode is provided. The apparatus includes at least: a determining unit configured to determining an LBT mechanism and/or an LBT mechanism parameter set based on related indication information and/or priority information and/or measurement information.

Optionally, the apparatus further includes: a feedback unit configured to transmit the determined LBT mechanism and/or LBT mechanism parameter set to a transmitting device, so as to cause the transmitting device to perform contention-based channel access based on the determined LBT mechanism and/or LBT mechanism parameter set.

Optionally, the LBT mechanism includes an LBT mechanism without random back-off and an LBT mechanism with random back-off.

Optionally, the LBT mechanism parameter set includes: when the LBT mechanism is an LBT Cat4 mechanism, at least one of: a minimum CW; a maximum CW; and a component n of a defer period, for the LBT Cat4 mechanism; or when the LBT mechanism is an LBT Cat2 mechanism, a time length of a Clear Channel Assessment (CCA) for the LBT Cat2 mechanism.

Optionally, when the LBT mechanism is the LBT Cat4 mechanism, the mechanism parameter set further includes: a time length of a first CCA.

Optionally, the apparatus further includes: a category determining unit configured to, when the LBT mechanism is an LBT Cat4 mechanism: divide the LBT mechanism parameter set into respective categories depending on different values of the maximum CW and the minimum CW and/or a size of the component n in the defer period in the parameter set for the LBT Cat4. The respective categories of the LBT mechanism parameter set can have their respective CW intervals, corresponding to their respective maximum CWs and minimum CWs, partially overlapping or not overlapping each other. The category determining unit is configured to, when the LBT mechanism is an LBT Cat2 mechanism: divide the LBT mechanism parameter set into respective categories depending on different time lengths of CCA for the LBT Cat2, or when the LBT mechanism includes the LBT Cat2 and the LBT Cat4: divide the LBT mechanism parameter set into respective categories depending on different time lengths of CCA, sizes of CWs and/or components n in the defer period.

Optionally, the determining unit is configured to:
when the related indication information is a size of data packet to be transmitted:
preconfigure a set of sizes for data to be transmitted corresponding to respective LBT mechanisms and/or LBT mechanism parameter sets; and
select the LBT mechanism and/or LBT mechanism parameter set corresponding to the size of data to be transmitted,
when the switching related information is a number of successive scheduled subframes:
preconfigure a set of numbers of successive scheduled subframes corresponding to the respective LBT mechanisms and/or LBT mechanism parameter sets; and
select the LBT mechanism and/or LBT mechanism parameter set corresponding to the number of successive scheduled subframes,
when the switching related information is one or more bits configured in Downlink Control Information (DCI) signaling:
preconfigure a set of bit information and/or numbers of bits configured in the DCI signaling corresponding to the respective LBT mechanisms and/or LBT mechanism parameter sets; and
select the LBT mechanism and/or LBT mechanism parameter set corresponding to the bit information and/or the number of bits configured in the DCI signaling for contention-based channel access,
when the switching related information is a broadcast scheme:
determine the LBT mechanism and/or LBT mechanism parameter set based on an identity in an LBT list set, a category of an LBT mechanism parameter set, an LBT mechanism and/or an LBT mechanism parameter set broadcasted to a transmitting device,
when the switching related information is a time-domain length of a gap between an uplink burst and a downlink burst:
preconfigure a set of time-domain lengths for the gaps corresponding to the respective LBT mechanisms and/or LBT mechanism parameter sets; and
determine the LBT mechanism and/or LBT mechanism parameter set corresponding to the time-domain length of the gap between the uplink burst and the downlink burst,
when the switching related information is an identity in an LBT list signaled from a base station:
preconfigure an information list of LBT mechanisms for switching, to be shared between that transmitting device and the base station; and
determine, by the transmitting device, the LBT mechanism and/or LBT mechanism parameter set based on information indicated by the base station via the list,
when the related indication information is a position of a scheduled subframe in a transmission burst or in successive uplink subframes:
preconfigure positions of the scheduled subframe in the transmission burst or positions of the scheduled subframe in the successive uplink subframes corresponding to respective LBT mechanisms and/or LBT mechanism parameter sets; and
determine the LBT mechanism and/or LBT mechanism parameter set based on the position of the scheduled subframe in the transmission burst or in the successive uplink subframes, and
when the related indication information is a carrier scenario for transmission of a scheduling instruction:
determine the LBT mechanism and/or LBT mechanism parameter set based on same-carrier scheduling or cross-carrier scheduling.

Optionally, the apparatus further includes: a contention processing unit configured to, when the switching related information is a time-domain length of a gap between an uplink burst and a downlink burst: preconfigure a set of time-domain lengths for the gaps corresponding to respective LBT mechanisms and/or LBT mechanism parameter sets; and determine to apply no LBT mechanism and/or LBT mechanism parameter set when the time-domain length of the gap between the uplink burst and the downlink burst is smaller than a predetermined threshold.

Optionally, the determining unit is configured to determine the LBT mechanism based on the related indication information, and then determine the LBT mechanism parameter set corresponding to the LBT mechanism based on different priority levels in the priority information.

Optionally, the determining unit is configured to, after determining the LBT mechanism based on the related indication information: determine a corresponding LBT mechanism, LBT mechanism parameter set or category of LBT mechanism parameter set based on different priorities contained in the priority information in accordance with a predetermined correspondence. The priority information includes a Quality of Service (QoS) priority for a traffic type, a priority of a channel, a priority of a signal, a priority of a logical channel, and/or the priorities of the channel, signal and logical channel.

Optionally, the apparatus further includes: an adjusting unit configured to, after the determining unit has determined the corresponding LBT mechanism, LBT mechanism parameter set or category of LBT mechanism parameter set in accordance with the predetermined correspondence: determine more specific parameters for the LBT mechanism based on the related indication information.

Optionally, the apparatus further includes: an adjustment processing unit configured to, when performing contention-based channel access based on the determined LBT mechanism and/or LBT mechanism parameter set: select, when the contention-based access has failed once, an LBT mechanism and/or an LBT mechanism parameter set corresponding to a higher priority level based on the priority information for subsequent contention-based channel access; select, when the contention-based access has succeeded once, an LBT mechanism and/or an LBT mechanism parameter set corresponding to a lower priority level based on the priority information for subsequent contention-based channel access; select, when the contention-based access based on the LBT mechanism and/or LBT mechanism parameter set has failed for a first predetermined threshold number of times, an LBT mechanism parameter set having a smaller Contention Window (CW) size and/or a shorter time length of Clear Channel Assessment (CCA), or a more simplified or faster LBT mechanism for contention-based channel access; or select, when the contention-based access based on the LBT mechanism and/or LBT mechanism parameter set has succeeded for a second predetermined threshold number of times, an LBT mechanism parameter set having a larger CW size and/or a longer time length of CCA, or a more complicated LBT mechanism for contention-based channel access. The first predetermined threshold number and the second first predetermined threshold number are predefined, obtained based on statistics, or indicated by a base station.

Optionally, the apparatus further includes: a retransmission adjusting unit configured to adjust an LBT mechanism and/or an LBT mechanism parameter set to a retransmission of data to be transmitted, such that different LBT mechanisms and/or LBT mechanism parameter sets are determined for an initial transmission and the retransmission.

Optionally, the retransmission adjusting unit is configured to: determine the LBT mechanism and/or LBT mechanism parameter set for the retransmission such that, when compared with the LBT mechanism and/or LBT mechanism parameter set selected for the initial transmission, a different LBT mechanism or the same LBT mechanism with a smaller Contention Window (CW) size and/or a shorter time length of Clear Channel Assessment (CCA) is determined for the retransmission.

Optionally, the determining unit is further configured to, for a plurality of successive uplink subframes: determine to use the same LBT mechanism or LBT mechanism parameter set or different LBT mechanisms or LBT mechanism parameter sets for the respective uplink subframes.

Optionally, the determining unit is further configured to, for same-carrier scheduling and for a plurality of successive uplink subframes: determine, before the first uplink subframe is transmitted, to use a fast LBT mechanism and LBT mechanism parameter set for fast contention-based channel access; and determine, for each of subsequent uplink subframes, to use a faster LBT mechanism and LBT mechanism parameter set than the LBT mechanism and LBT mechanism parameter set used for the previous uplink subframe, for fast contention-based channel access. The fast LBT mechanism or LBT mechanism parameter set determined for the first uplink subframe is configured with a number of Orthogonal Frequency Division Multiplexing (OFDM) symbols.

Optionally, the determining unit is further configured to, for same-carrier scheduling: determine, before the first uplink subframe is transmitted, to use a fast LBT mechanism and LBT mechanism parameter set for fast contention-based channel access; and determine, for each of subsequent uplink subframes, not to use any LBT mechanism and LBT mechanism parameter set for fast contention-based channel access.

Optionally, the determining unit is further configured to, for same-carrier scheduling and for a plurality of successive uplink subframes: determine, before the first uplink subframe is transmitted, to use a fast LBT mechanism and LBT mechanism parameter set for fast contention-based channel access; and determine, for each of subsequent uplink subframes, to use an LBT mechanism and an LBT mechanism parameter set having the same speed as the LBT mechanism and LBT mechanism parameter set used for the first uplink subframe, for fast contention-based channel access. The fast LBT mechanism and LBT mechanism parameter set determined for the first uplink subframe are configured with a number of Orthogonal Frequency Division Multiplexing (OFDM) symbols, and the fast LBT mechanism and LBT mechanism parameter set determined for each of the subsequent uplink subframes are configured with one OFDM symbol.

Optionally, the determining unit is further configured to, for cross-carrier scheduling and for a plurality of successive uplink subframes: determine, before the first uplink subframe is transmitted, to use an LBT Cat4 mechanism when no data is to be transmitted in downlink and uplink grant information is transmitted over a licensed carrier; and determine, for each of subsequent uplink subframes, to use a LBT Cat4 mechanism having a smaller Contention Window (CW) than the LBT Cat4 mechanism used for the previous uplink subframe, or a more simplified LBT mechanism.

Optionally, the determining unit is further configured to, for cross-carrier scheduling: determine, before the first uplink subframe is transmitted, to use an LBT Cat4 mechanism when no data is to be transmitted in downlink and uplink grant information is transmitted over a licensed carrier; and determine, for each of subsequent uplink subframes, to apply no LBT mechanism and/or LBT mechanism parameter set for fast contention-based channel access.

Optionally, the determining unit is further configured to, for cross-carrier scheduling and for a plurality of successive uplink subframes: determine, before the first uplink subframe is transmitted, to use an LBT Cat4 mechanism when no data is to be transmitted in downlink and uplink grant information is transmitted over a licensed carrier; and determine, for each of subsequent uplink subframes, to use a LBT Cat4 mechanism having a smaller Contention Window (CW) than the LBT Cat4 mechanism used for the previous uplink subframe, or a more simplified LBT mechanism. The LBT Cat4 mechanism determined for the first uplink subframe is configured with a number of Orthogonal Frequency Division Multiplexing (OFDM) symbols, and the LBT Cat4 mechanism or the more simplified LBT mechanism determined for each of the subsequent uplink subframes is configured with one OFDM symbol.

Optionally, the apparatus further includes a position determining unit configured to, for a plurality of successive uplink subframes: using the first uplink subframe as a position for applying the LBT mechanism and/or LBT mechanism parameter set before the second uplink subframe; and using, for each of subsequent uplink subframes, the last Orthogonal Frequency Division Multiplexing (OFDM) symbol of the previous uplink subframe as a position for applying the LBT mechanism and/or LBT mechanism parameter set for that uplink subframe.

Optionally, the apparatus further includes an obtaining unit configured to obtain a position of an uplink subframe in a transmission burst or apply the LBT mechanism and/or LBT mechanism parameter set by:

for a fixed frame structure:

applying, by the transmitting device, the LBT mechanism and/or LBT mechanism parameter set based on a position of a subframe in which it is scheduled, in accordance with a predefined rule, or for a flexible uplink/downlink subframe structure:

notifying, by a base station, to the transmitting device explicitly via an indication message whether a scheduled subframe is the first subframe or a subframe that is a particular number of subframes behind the first subframe, or indicating, by the base station, to the transmitting device via dynamic Downlink Control Information (DCI) the LBT mechanism and/or LBT mechanism parameter set to be applied on the scheduled subframe.

Optionally, the apparatus further includes a priority policy unit configured to, when there is a plurality of different priority levels in a burst transmitted from a transmitted device: determine the LBT mechanism and/or LBT mechanism parameter set in accordance with a predetermined priority policy.

Optionally, the LBT mechanism or LBT mechanism parameter set is obtained by one of: determining the LBT mechanism or LBT mechanism parameter set based on information on a subframe in which a User Equipment (UE) is scheduled, determining the LBT mechanism or LBT mechanism parameter set based on Downlink Control Information (DCI) signaling transmitted from a base station to the UE, or determining the LBT mechanism or LBT mechanism parameter set based on higher layer Radio Resource Control (RRC) signaling.

Optionally, the information on the subframe in which the UE is scheduled is determined based on physical layer DCI signaling.

Optionally, for a plurality of uplink subframes or when a plurality of successive subframes is scheduled:

an LBT Cat4 is applied on the first uplink subframe and an LBT Cat2 is applied on a plurality of subsequent uplink subframes, the LBT Cat2 is applied on the first uplink subframe and the LBT Cat2 is applied on a plurality of subsequent uplink subframes, the LBT Cat4 is applied on the first uplink subframe and the LBT Cat4 is applied on a plurality of subsequent uplink subframes, the LBT Cat4 is applied on the first uplink subframe and, for each of a plurality of subsequent uplink subframes, a smaller Contention Window (CW) is applied than the previous subframe, the LBT Cat4 is applied on the first uplink subframe and no LBT is applied on a plurality of subsequent uplink subframes, or the LBT Cat2 is applied on the first uplink subframe and no LBT is applied on a plurality of subsequent uplink subframes.

Optionally, for a plurality of uplink subframes or when a plurality of successive subframes is scheduled:

when an LBT has succeeded on an uplink subframe, no LBT is applied on subsequent uplink subframes, when an LBT has succeeded on an uplink subframe, an LBT is applied on subsequent uplink subframes in accordance with an LBT mechanism or LBT mechanism parameter set signaled by a base station, when an LBT has failed on an uplink subframe, an LBT is applied on the next uplink subframe in accordance with the same LBT mechanism or LBT mechanism parameter set as the one applied on that uplink subframe, when an LBT has failed on an uplink subframe, an LBT is applied on the next uplink subframe in accordance with an LBT mechanism or LBT mechanism parameter set configured by the base station, when an LBT has failed on an uplink subframe, an LBT is applied on the next uplink subframe in accordance with a preconfigured LBT mechanism or LBT mechanism parameter set, or when an LBT has failed on an uplink subframe, an LBT is applied on the next uplink subframe in accordance with a default LBT mechanism or LBT mechanism parameter set.

Optionally, when a User Equipment (UE) has failed successively for a number of times in accessing a channel in accordance with a configured LBT mechanism or LBT mechanism parameter set, an LBT priority, the LBT mechanism or the LBT mechanism parameter set is adjusted based on one of:

an indication signaled by a base station, a measurement of feedback information, a measurement of interference condition, or a priority of at least one of: a transmitted channel, a transmitted signal, a transmitted logical channel, or a type of transmitted traffic.

Optionally, an Information Element (IE) field for indicating the LBT mechanism or LBT mechanism parameter set is added in the physical layer DCI signaling or the higher layer RRC signaling. The IE field uses n bits, where n is an integer larger than or equal to 1.

With the solutions according to the embodiments of the present disclosure, an LBT mechanism and/or an LBT mechanism parameter set can be determined based on related indication information and/or priority information and/or measurement information. A transmitting device can perform contention-based channel access based on the determined LBT mechanism and/or LBT mechanism parameter set. With the solutions according to the embodiments of the present disclosure, an LBT mode can be determined. With the selection of the LBT mode, it is possible to avoid waste of channel resources and indication information due to an improper LBT mode, thereby improving an efficiency of contention-based channel access.

BRIEF DESCRIPTION OF THE DRAWINGS

The present disclosure can be further understood with reference to the figures described below, which constitute a part of the present disclosure. The figures and the illustrative embodiments of the present disclosure are provided for explaining, rather than limiting, the present disclosure. In the figures.

DETAILED DESCRIPTION OF THE EMBODIMENTS

In the following, the embodiments of the present disclosure will be described in detail with reference to the figures, such that the objects, solutions and advantages of the present disclosure will become more apparent. It is to be noted that the embodiments, and the features thereof, can be combined with each other, provided that they do not conflict.

Figure 1:
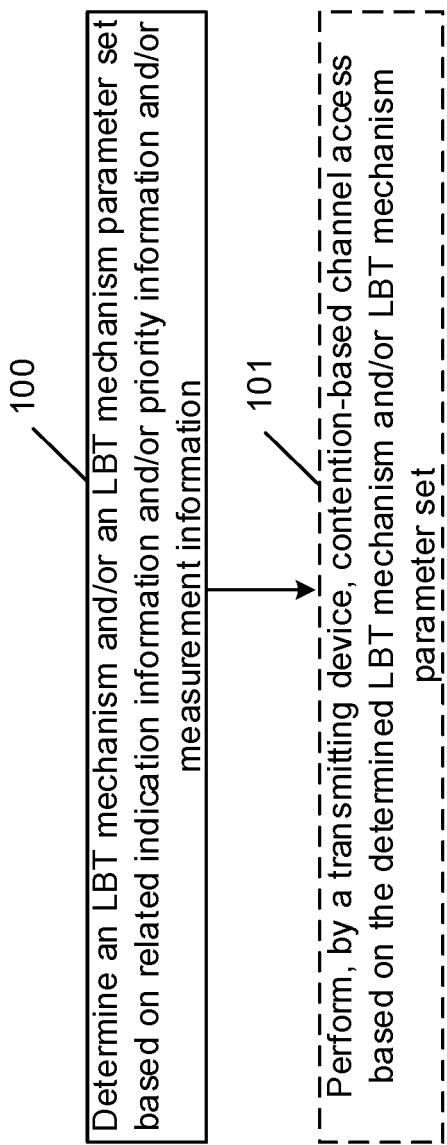
FIG. 1 is a flowchart illustrating a method for determining an LBT mode according to an embodiment of the present disclosure.

FIG. 1 is a flowchart illustrating a method for LBT mode switching according to an embodiment of the present disclosure. As shown in FIG. 1, the method includes the following steps.

At step 100, an LBT mechanism and/or an LBT mechanism parameter set is determined based on related indication information and/or priority information and/or measurement information.

It is to be noted that the LBT mechanism and/or LBT mechanism parameter set can be determined by a transmitted device or a base station. When the determination is made by the base station, the determined LBT mechanism and/or LBT mechanism parameter set needs to be transmitted to the transmitting device, such that the transmitting device can obtain the LBT mechanism and/or LBT mechanism parameter for use in contention-based channel access.

In this step, the related indication information can include: a size of data packet to be transmitted, a number of successive scheduled subframes, one or more bits configured in physical Downlink Control Information (DCI) signaling, a broadcast scheme, a time-domain length of a gap between an uplink transmission burst and a downlink transmission burst, an identity in an LBT list signaled from a base station, a position of a scheduled subframe in a transmission burst or in successive uplink subframes, a length of one transmission burst, and/or a carrier scenario for transmission of a scheduling instruction.

It is to be noted that, when the related indication information includes more than one indication, the LBT mechanism and/or LBT mechanism parameter set can be selected as desired. For example, when the related indication information indicates the size of data packet to be transmitted and the number of successive scheduled subframes, the LBT mechanism can be determined based on the size of data packet to be transmitted, and the parameters set associated with the determined LBT mechanism can be selected based on the number of successive scheduled subframes. This may depend on actual implementations.

The priority information can include: a Quality of Service (QoS) priority for a traffic type of data to be transmitted, or a priority of a channel, a signal and/or a logical channel for the data to be transmitted, and/or the priorities of the channel, signal and logical channel.

The priority information can further include: a priority of a physical transmission channel, obtained by mapping a level of the priority of the logical channel to the physical transmission channel.

The measurement can include: Channel State Information (CSI) within a predetermined time length, a Reference Signal Received Power (RSRP) within a predetermined time length, a Reference Signal Received Quality (RSRQ) within a predetermined time length, Hybrid Automatic Repeat reQuest—Acknowledge (HARQ-ACK) information, or information on a measured interference.

Preferably, the LBT mechanism in the embodiment of the present disclosure can include an LBT mechanism without random back-off and an LBT mechanism with random back-off.

Here, the LBT mechanism without random back-off can include an LBT Cat2 mechanism and an enhanced LBT Cat2 mechanism.

Preferably, the LBT Cat2 mechanism can be an LBT mechanism in which only one Clear Channel Assessment (CCA) is performed.

The enhanced LBT Cat2 mechanism can be an LBT mechanism in which two or more CCAs are performed.

Further, each CCA can have a fixed or random start position.

Each CCA can have a time length of 34 microseconds (μs), 25 μs, 20 μs, 16 μs, 9 μs or 4 μs.

The LBT mechanism with random back-off can include an LBT Cat4 mechanism having a variable Contention Window (CW) size and an LBT Cat3 mechanism having a fixed CW size. The LBT Cat4 mechanism can include at least one of the following parameters: a first CCA; a defer period; a maximum CW, CWmax; a minimum CW, CWmin; and a random back-off value, N. The first CCA can be an initial CCA.

The defer period can include defer time plus n multiplied by slot, or n multiplied by slot plus defer time, where n is an integer in an interval of [0, 2], slot has a time-length of 9 μs, and the defer time is 16 μs.

It is to be noted that, in a Wi-Fi system, the feedback time for one ACK or Negative ACK (NACK) is 16 μs and the length of one slot is 9 μs.

Preferably, the first CCA can have a time length of 34 μs, 25 μs, 20 μs, 16 μs, 9 μs or 4 μs.

The random back-off value N can be a value selected randomly from an interval of [0, q−1], where q is a value selected randomly from an interval of [CWmin, CWmax].

The random back-off value N can be indicated by a base station, generated randomly or predetermined.

When the LBT mechanism and/or LBT mechanism parameter set is for an uplink channel, n is 0, 1 or 2. When the LBT mechanism and/or LBT mechanism parameter set is for a downlink channel, n is a natural number ranging from 1 to 7.

When the LBT mechanism is an LBT Cat4 mechanism, the LBT mechanism parameter set can include at least one of: a minimum CW; a maximum CW; and a component n of a defer period for the LBT Cat4 mechanism. When the LBT mechanism is an LBT Cat2 mechanism, the LBT mechanism parameter set can include a time length of a CCA for the LBT Cat2 mechanism.

When the LBT mechanism is the LBT Cat4 mechanism, the mechanism parameter set can further include: a time length of the first CCA.

In an embodiment of the present disclosure, when the LBT mechanism is the LBT Cat4 mechanism, the method can further include: dividing the LBT mechanism parameter set into respective categories depending on different values of the maximum CW and the minimum CW and/or a size of the component n in the defer period in the parameter set for the LBT Cat4. The respective categories of the LBT mechanism parameter set can have their respective CW intervals, corresponding to their respective maximum CWs and minimum CWs, partially overlapping or not overlapping each other.

In an embodiment of the present disclosure, when the LBT mechanism is the LBT Cat2 mechanism, the method can further include: dividing the LBT mechanism parameter set into respective categories depending on different time lengths of CCA for the LBT Cat2.

In an embodiment of the present disclosure, when the LBT mechanism includes the LBT Cat2 and the LBT Cat4, the method can further include: dividing the LBT mechanism parameter set into respective categories depending on different time lengths of CCA, sizes of CWs and/or components n in the defer period.

The respective categories of the LBT mechanism parameter set are based on priorities, predefined, divided based on values of available maximum CWs, divided based on time lengths of CCA, indicated by a base station, or indicated dynamically in DCI.

It is to be noted that the respective categories can be predefined by those skilled in the art based on an empirical value. The respective categories being divided based on values of available maximum CWs belongs to a common practice in the art and further details thereof will be omitted here.

When the related indication information is the size of data packet to be transmitted, the operation of determining the LBT mechanism and/or LBT mechanism parameter set based on the related indication information can include: preconfiguring a set of sizes for data to be transmitted corresponding to respective LBT mechanisms and/or LBT mechanism parameter sets; and selecting the LBT mechanism and/or LBT mechanism parameter set corresponding to the size of data packet to be transmitted.

When the switching related information is the number of successive scheduled subframes, the operation of determining the LBT mechanism and/or LBT mechanism parameter set based on the related indication information can include: preconfiguring a set of numbers of successive scheduled subframes corresponding to the respective LBT mechanisms and/or LBT mechanism parameter sets; and selecting the LBT mechanism and/or LBT mechanism parameter set corresponding to the number of successive scheduled subframes.

When the switching related information is the one or more bits configured in Downlink Control Information (DCI) signaling, the operation of determining the LBT mechanism and/or LBT mechanism parameter set based on the related indication information can include: preconfiguring a set of bit information and/or numbers of bits configured in the DCI signaling corresponding to the respective LBT mechanisms and/or LBT mechanism parameter sets; and selecting the LBT mechanism and/or LBT mechanism parameter set corresponding to the bit information and/or the number of bits configured in the DCI signaling for contention-based channel access.

When the switching related information is the broadcast scheme, the operation of determining the LBT mechanism and/or LBT mechanism parameter set based on the related indication information can include: determining the LBT mechanism and/or LBT mechanism parameter set based on an identity in an LBT list set, a category of an LBT mechanism parameter set, an LBT mechanism and/or an LBT mechanism parameter set broadcasted to a transmitting device.

When the switching related information is the time-domain length of the gap between the uplink burst and the downlink burst, the operation of determining the LBT mechanism and/or LBT mechanism parameter set based on the related indication information can include: preconfiguring a set of time-domain lengths for gaps corresponding to the respective LBT mechanisms and/or LBT mechanism parameter sets; and determining the LBT mechanism and/or LBT mechanism parameter set corresponding to the time-domain length of the gap between the uplink burst and the downlink burst.

When the switching related information is the identity in an LBT list signaled from a base station, the operation of determining the LBT mechanism and/or LBT mechanism parameter set based on the related indication information can include: preconfiguring an information list of LBT mechanisms for switching, to be shared between that transmitting device and the base station; and determining, by the transmitting device, the LBT mechanism and/or LBT mechanism parameter set based on an identity in the information list as indicated or broadcasted by the base station.

When the related indication information is the position of the scheduled subframe in the transmission burst or in the successive uplink subframes, the operation of determining the LBT mechanism and/or LBT mechanism parameter set based on the related indication information can include: preconfiguring positions of the scheduled subframe in the transmission burst or positions of the scheduled subframe in the successive uplink subframes corresponding to respective LBT mechanisms and/or LBT mechanism parameter sets; and determining the LBT mechanism and/or LBT mechanism parameter set based on the position of the scheduled subframe in the transmission burst or in the successive uplink subframes.

When the related indication information is the carrier scenario for transmission of the scheduling instruction, the operation of determining the LBT mechanism and/or LBT mechanism parameter set based on the related indication information can include: determining the LBT mechanism and/or LBT mechanism parameter set based on same-carrier scheduling or cross-carrier scheduling.

In an embodiment of the present disclosure, when the switching related information is the time-domain length of the gap between the uplink burst and the downlink burst, the method can further include: preconfiguring a set of time-domain lengths for the gaps corresponding to respective LBT mechanisms and/or LBT mechanism parameter sets; and determining to apply no LBT mechanism and/or LBT mechanism parameter set when the time-domain length of the gap between the uplink burst and the downlink burst is smaller than a predetermined threshold.

It is to be noted that the predefined threshold can be 16 μs or 25 μs.

The operation of determining the LBT mechanism and/or LBT mechanism parameter set based on the related indication information and the priority information can include: determining the LBT mechanism based on the related indication information, and then determining the LBT mechanism parameter set corresponding to the LBT mechanism based on different priority levels in the priority information.

The operation of determining the LBT mechanism parameter set corresponding to the LBT mechanism based on different priority levels in the priority information can include: determining a corresponding LBT mechanism, LBT mechanism parameter set or category of LBT mechanism parameter set based on different priorities contained in the priority information in accordance with a predetermined correspondence. The priority information includes a QoS priority for a traffic type, a priority of a channel, a priority of a signal, and/or a priority of a logical channel.

In an embodiment of the present disclosure, the method can further include, subsequent to determining the corresponding LBT mechanism, LBT mechanism parameter set or category of LBT mechanism parameter set in accordance with the predetermined correspondence: determining more specific parameters for the LBT mechanism based on the related indication information.

It is to be noted that the operation of determining the more specific parameters can include: after the LBT mechanism to be used has been determined, further determining what LBT parameters are to be used in different situations in the LBT mechanism based on the related indication information. For example, when an LBT Cat4 has been determined, specifics of the LBT Cat4 can be determined based on the index of the scheduled subframe in the related indication information. For example, the LBT Cat4 can be further determined to have CWmin of 1 and CWmax of 3.

Of course, when the LBT has failed for a number of times or has succeeded in accordance with the LBT mechanism or LBT mechanism parameter set at the priority level of 3, the LBT mechanism or parameter set can be further adjusted based on a measurement of feedback information, or the LBT parameter can be selected further in combination of the position of the scheduled subframe.

At step 101, the transmitting device performs contention-based channel access based on the determined LBT mechanism and/or LBT mechanism parameter set.

In an embodiment of the present disclosure, when performing contention-based channel access based on the determined LBT mechanism and/or LBT mechanism parameter set, the method can further include:

selecting, when the contention-based access has failed once, an LBT mechanism and/or an LBT mechanism parameter set corresponding to a higher priority level based on the priority information for subsequent contention-based channel access;

selecting, when the contention-based access has succeeded once, an LBT mechanism and/or an LBT mechanism parameter set corresponding to a lower priority level based on the priority information for subsequent contention-based channel access;

(It is to be noted here that, in general, using a higher or lower priority level for a failed or succeeded contention-based access means using a priority level that is one level lower than the succeeded contention-based access or one level higher than the failed contention-based access.)

selecting, when the contention-based access based on the LBT mechanism and/or

LBT mechanism parameter set has failed for a first predetermined threshold number of times, an LBT mechanism parameter set having a smaller Contention Window (CW) size and/or a shorter time length of Clear Channel Assessment (CCA), or a more simplified LBT mechanism for contention-based channel access; or (It is to be note here that the more simplified LBT mechanism is an empirical concept used by those skilled in the art. For example, the LBT Cat2 is a more simplified mechanism than the LBT Cat4. As another example, when the fast LBT mechanisms are used, the LBT mechanisms, in a descending order of simplification, can be: the LBT Cat2 (the most simplified), the enhanced LBT Cat2, the ECCA process, the defer period plus ECCA process, and the first CCA plus defer period and ECCA process.)

selecting, when the contention-based access based on the LBT mechanism and/or LBT mechanism parameter set has succeeded for a second predetermined threshold number of times, an LBT mechanism parameter set having a larger CW size and/or a longer time length of CCA, or a more complicated LBT mechanism for contention-based channel access.

(It is to be noted here that the concept of "more complicated" is opposite to the concept of "more simplified" and can be deduced from the latter. For example, the enhanced LBT Cat2 is more complicated than the LBT Cat2.)

The first predetermined threshold number and the second first predetermined threshold number can be predefined, obtained based on statistics, or indicated by a base station.

In an embodiment of the present disclosure, the method can further include: selecting different LBT mechanisms and/or LBT mechanism parameter sets for an initial transmission and a retransmission.

The operation of selecting different LBT mechanisms and/or LBT mechanism parameter sets for the initial transmission and the retransmission can include: determining the LBT mechanism and/or LBT mechanism parameter set for the retransmission such that, when compared with the LBT mechanism and/or LBT mechanism parameter set selected for the initial transmission, a different LBT mechanism or the same LBT mechanism with a smaller CW size and/or a shorter time length of CCA is determined for the retransmission.

When the data to be transmitted includes a plurality of successive uplink subframes, the operation of determining the LBT mechanism and/or LBT mechanism parameter set can include, for the plurality of successive uplink subframes: determining to use the same LBT mechanism or LBT mechanism parameter set or different LBT mechanisms or LBT mechanism parameter sets for the respective uplink subframes.

In particular, for same-carrier scheduling and for the plurality of successive uplink subframes, the operation of determining to use different LBT mechanisms or LBT mechanism parameter sets for the respective uplink subframes can include: determining, before the first uplink subframe is transmitted, to use a fast LBT mechanism and LBT mechanism parameter set for fast contention-based channel access; and determining, for each of subsequent uplink subframes, to use a faster LBT mechanism and LBT mechanism parameter set than the LBT mechanism and LBT mechanism parameter set used for the previous uplink subframe, for fast contention-based channel access. The fast LBT mechanism or LBT mechanism parameter set determined for the first uplink subframe is configured with a number of Orthogonal Frequency Division Multiplexing (OFDM) symbols. Typically, the term "a number of" means two or more.

In an embodiment of the present disclosure, for same-carrier scheduling, the method can further include, when it is determined, before the first uplink subframe is transmitted, to use the fast LBT mechanism and LBT mechanism parameter set for fast contention-based channel access: determining, for each of subsequent uplink subframes, not to use any LBT mechanism and LBT mechanism parameter set for fast contention-based channel access.

For same-carrier scheduling and for the plurality of successive uplink subframes, the operation of determining to use the same LBT mechanism or LBT mechanism parameter set for the respective uplink subframes can include: determining, before the first uplink subframe is transmitted, to use a fast LBT mechanism and LBT mechanism parameter set for fast contention-based channel access; and determining, for each of subsequent uplink subframes, to use the same LBT mechanism and LBT mechanism parameter set as the LBT mechanism and LBT mechanism parameter set used for the first uplink subframe, for fast contention-based channel access. The fast LBT mechanism and LBT mechanism parameter set determined for the first uplink subframe are configured with a number of OFDM symbols, and the fast LBT mechanism and LBT mechanism parameter set determined for each of the subsequent uplink subframes are configured with one OFDM symbol.

Here, the fast LBT mechanism and LBT mechanism parameter set include at least one of: an LBT Cat4 mechanism having a maximum CW smaller than a CW for a downlink LBT Cat4, or a defer period plus Extended Clear Channel Assessment (ECCA) process, a direct ECCA, an enhanced LBT Cat2 and an LBT Cat2.

It is to be noted that, in the defer period+ECCA process, a CCA having a time length equal to the defer period is performed first and, if the channel is assessed to be busy in the defer period, an ECCA random back-off is applied. Here, the ECCA process is to perform a CCA having a random back-off value of N slots. Only when the channel is assessed to be idle in one slot, the CCA in the next slot can be performed. When the channel is assessed to be idle in one slot, the random back-off value N is decremented by 1. If the channel is busy, the CCA in the defer period is performed. Here, if the channel is assessed to be idle in the defer period, the random back-off value N can also be decremented.

For cross-carrier scheduling and for the plurality of successive uplink subframes, the operation of determining to use different LBT mechanisms or LBT mechanism parameter sets for the respective uplink subframes can include: determining, before the first uplink subframe is transmitted, to use a normal LBT Cat4 mechanism when no data is to be transmitted in downlink and uplink grant information is transmitted over a licensed carrier; and determining, for each of subsequent uplink subframes, to use a LBT Cat4 mechanism having a smaller CW than the LBT Cat4 mechanism used for the previous uplink subframe, or a more simplified LBT mechanism.

Preferably, the LBT Cat4 mechanism determined for the first uplink subframe can be configured with a number of OFDM symbols, and the LBT Cat4 mechanism or the more simplified LBT mechanism determined for each of the subsequent uplink frames can be configured with one OFDM symbol.

In an embodiment of the present disclosure, for cross-carrier scheduling, the method can further include: determining, before the first uplink subframe is transmitted, to use an LBT Cat4 mechanism when no data is to be transmitted in downlink and uplink grant information is transmitted over a licensed carrier; and determining, for each of subsequent uplink subframes, to apply no LBT mechanism and/or LBT mechanism parameter set for contention-based channel access.

In an embodiment of the present disclosure, when all subframes are uplink subframes, the method can further include: using the first uplink subframe as a position for applying the LBT mechanism and/or LBT mechanism parameter set before the second uplink subframe; and using, for each of subsequent uplink subframes, the last Orthogonal Frequency Division Multiplexing (OFDM) symbol of the previous uplink subframe as a position for applying the LBT mechanism and/or LBT mechanism parameter set for that uplink subframe.

In an embodiment of the present disclosure, the method can further include, for a plurality of successive uplink subframes: obtaining, by the transmitting device, a position of an uplink subframe in a transmission burst or applying the LBT mechanism and/or LBT mechanism parameter set by:
for a fixed frame structure:
applying, by the transmitting device, the LBT mechanism and/or LBT mechanism parameter set based on a position of a subframe in which it is scheduled, in accordance with a predefined rule, or
for a flexible uplink/downlink subframe structure:
notifying, by a base station, to the transmitting device explicitly via an indication message whether a scheduled subframe is the first subframe or a subframe that is a particular number of subframes behind the first subframe, or
indicating, by the base station, to the transmitting device via dynamic Downlink Control Information (DCI) the LBT mechanism and/or LBT mechanism parameter set to be applied on the scheduled subframe.

In an embodiment of the present disclosure, when there is a plurality of different priority levels in a burst transmitted from a transmitted device, the method can further include: performing contention-based channel access in accordance with a predetermined LBT policy.

Optionally, the LBT mechanism or LBT mechanism parameter set can be obtained by one of: determining the LBT mechanism or LBT mechanism parameter set based on information on a subframe in which a User Equipment (UE) is scheduled, determining the LBT mechanism or LBT mechanism parameter set based on Downlink Control Information (DCI) signaling transmitted from a base station to the UE, or determining the LBT mechanism or LBT mechanism parameter set based on higher layer Radio Resource Control (RRC) signaling.

Optionally, the information on the subframe in which the UE is scheduled can be determined based on physical layer DCI signaling.

Optionally, for a plurality of uplink subframes or when a plurality of successive subframes is scheduled:
an LBT Cat4 is applied on the first uplink subframe and an LBT Cat2 is applied on a plurality of subsequent uplink subframes,
the LBT Cat2 is applied on the first uplink subframe and the LBT Cat2 is applied on a plurality of subsequent uplink subframes,
the LBT Cat4 is applied on the first uplink subframe and the LBT Cat4 is applied on a plurality of subsequent uplink subframes,
the LBT Cat4 is applied on the first uplink subframe and, for each of a plurality of subsequent uplink subframes, a smaller Contention Window (CW) is applied than the previous subframe,
the LBT Cat4 is applied on the first uplink subframe and no LBT is applied on a plurality of subsequent uplink subframes, or
the LBT Cat2 is applied on the first uplink subframe and no LBT is applied on a plurality of subsequent uplink subframes.

Optionally, for a plurality of uplink subframes or when a plurality of successive subframes is scheduled:
when an LBT has succeeded on an uplink subframe, no LBT is applied on subsequent uplink subframes,
when an LBT has succeeded on an uplink subframe, an LBT is applied on subsequent uplink subframes in accordance with an LBT mechanism or LBT mechanism parameter set signaled by a base station, when an LBT has failed on an uplink subframe, an LBT is applied on the next uplink subframe in accordance with the same LBT mechanism or LBT mechanism parameter set as the one applied on that uplink subframe, when an LBT has failed on an uplink subframe, an LBT is applied on the next uplink subframe in accordance with an LBT mechanism or LBT mechanism parameter set configured by the base station, when an LBT has failed on an uplink subframe, an LBT is applied on the next uplink subframe in accordance with a preconfigured LBT mechanism or LBT mechanism parameter set, or when an LBT has failed on an uplink subframe, an LBT is applied on the next uplink subframe in accordance with a default LBT mechanism or LBT mechanism parameter set.

Optionally, when a User Equipment (UE) has failed successively for a number of times in accessing a channel in accordance with a configured LBT mechanism or LBT mechanism parameter set, the method can further include: adjusting an LBT priority, the LBT mechanism or the LBT mechanism parameter set based on one of:

an indication signaled by a base station, a measurement of feedback information, a measurement of interference condition, or a priority of at least one of: a transmitted channel, a transmitted signal, a transmitted logical channel, or a type of transmitted traffic.

Optionally, an Information Element (IE) field for indicating the LBT mechanism or LBT mechanism parameter set can be added in the physical layer DCI signaling or the higher layer RRC signaling. The IE field can use n bits, where n is an integer larger than or equal to 1.

With the method according to the embodiments of the present disclosure, an LBT mode can be determined. With the selection of the LBT mode, it is possible to avoid waste of channel resources and indication information due to an improper LBT mode, thereby improving an efficiency of contention-based channel access.

Figure 2:
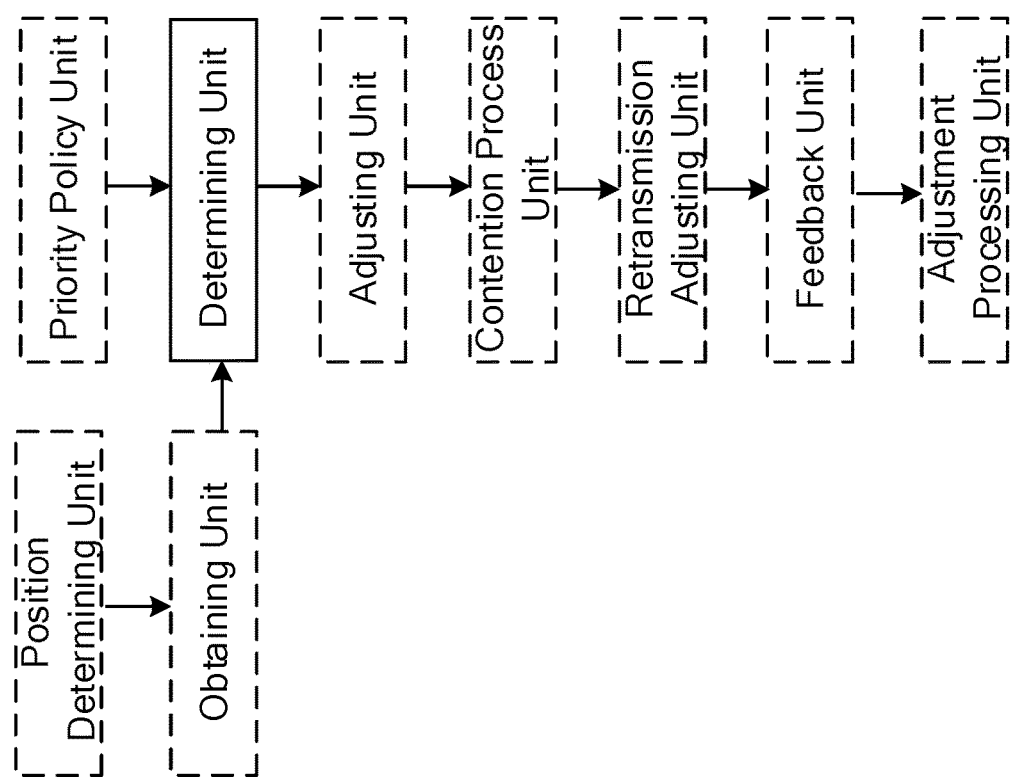
FIG. 2 is a block diagram showing a structure of an apparatus for determining an LBT mode according to an embodiment of the present disclosure.

FIG. 2 is a block diagram showing a structure of an apparatus for determining an LBT mode according to an embodiment of the present disclosure. As shown in FIG. 2, the apparatus includes at least: a determining unit configured to determining an LBT mechanism and/or an LBT mechanism parameter set based on related indication information and/or priority information and/or measurement information.

In an embodiment of the present disclosure, the apparatus can further include: a feedback unit configured to transmit the determined LBT mechanism and/or LBT mechanism parameter set to a transmitting device, so as to cause the transmitting device to perform contention-based channel access based on the determined LBT mechanism and/or LBT mechanism parameter set.

The LBT mechanism can include an LBT mechanism without random back-off and an LBT mechanism with random back-off.

When the LBT mechanism is an LBT Cat4 mechanism, the LBT mechanism parameter set can include at least one of: a minimum CW; a maximum CW; and a component n of a defer period for the LBT Cat4 mechanism. When the LBT mechanism is an LBT Cat2 mechanism, the LBT mechanism parameter set can include a time length of a CCA for the LBT Cat2 mechanism.

When the LBT mechanism is the LBT Cat4 mechanism, the mechanism parameter set can further include: a time length of a first CCA.

In an embodiment of the present disclosure, the apparatus can further include: a category determining unit configured to, when the LBT mechanism is an LBT Cat4 mechanism: divide the LBT mechanism parameter set into respective categories depending on different values of the maximum CW and the minimum CW and/or a size of the component n in the defer period in the parameter set for the LBT Cat4. The respective categories of the LBT mechanism parameter set can have their respective CW intervals, corresponding to their respective maximum CWs and minimum CWs, partially overlapping or not overlapping each other. The category determining unit can be configured to, when the LBT mechanism is an LBT Cat2 mechanism: divide the LBT mechanism parameter set into respective categories depending on different time lengths of CCA for the LBT Cat2, or when the LBT mechanism includes the LBT Cat2 and the LBT Cat4: divide the LBT mechanism parameter set into respective categories depending on different time lengths of CCA, sizes of CWs and/or components n in the defer period.

The determining unit can be configured to:

when the related indication information is a size of data packet to be transmitted:

preconfigure a set of sizes for data to be transmitted corresponding to respective LBT mechanisms and/or LBT mechanism parameter sets; and select the LBT mechanism and/or LBT mechanism parameter set corresponding to the size of data packet to be transmitted, when the switching related information is a number of successive scheduled subframes:

preconfigure a set of numbers of successive scheduled subframes corresponding to the respective LBT mechanisms and/or LBT mechanism parameter sets; and select the LBT mechanism and/or LBT mechanism parameter set corresponding to the number of successive scheduled subframes, when the switching related information is one or more bits configured in Downlink Control Information (DCI) signaling:

preconfigure a set of bit information and/or numbers of bits configured in the DCI signaling corresponding to the respective LBT mechanisms and/or LBT mechanism parameter sets; and select the LBT mechanism and/or LBT mechanism parameter set corresponding to the bit information and/or the number of bits configured in the DCI signaling for contention-based channel access, when the switching related information is a broadcast scheme:

determine the LBT mechanism and/or LBT mechanism parameter set based on an identity in an LBT list set, a category of an LBT mechanism parameter set, an LBT mechanism and/or an LBT mechanism parameter set broadcasted to a transmitting device, when the switching related information is a time-domain length of a gap between an uplink burst and a downlink burst:

preconfigure a set of time-domain lengths for the gaps corresponding to the respective LBT mechanisms and/or LBT mechanism parameter sets; and determine the LBT mechanism and/or LBT mechanism parameter set corresponding to the time-domain length of the gap between the uplink burst and the downlink burst, when the switching related information is an identity in an LBT list signaled from a base station:
  preconfigure an information list of LBT mechanisms for switching, to be shared between that transmitting device and the base station; and
  determine, by the transmitting device, the LBT mechanism and/or LBT mechanism parameter set based on information indicated by the base station via the list,
when the related indication information is a position of a scheduled subframe in a transmission burst or in successive uplink subframes:
  preconfigure positions of the scheduled subframe in the transmission burst or positions of the scheduled subframe in the successive uplink subframes corresponding to respective LBT mechanisms and/or LBT mechanism parameter sets; and
  determine the LBT mechanism and/or LBT mechanism parameter set based on the position of the scheduled subframe in the transmission burst or in the successive uplink subframes, and
when the related indication information is a carrier scenario for transmission of a scheduling instruction:
  determine the LBT mechanism and/or LBT mechanism parameter set based on same-carrier scheduling or cross-carrier scheduling.

In an embodiment of the present disclosure, the apparatus can further include: a contention processing unit configured to, when the switching related information is a time-domain length of a gap between an uplink burst and a downlink burst: preconfigure a set of time-domain lengths for the gaps corresponding to respective LBT mechanisms and/or LBT mechanism parameter sets; and determine to apply no LBT mechanism and/or LBT mechanism parameter set when the time-domain length of the gap between the uplink burst and the downlink burst is smaller than a predetermined threshold.

The determining unit can be configured to determine the LBT mechanism based on the related indication information, and then determine the LBT mechanism parameter set corresponding to the LBT mechanism based on different priority levels in the priority information.

The determining unit can be configured to, after determining the LBT mechanism based on the related indication information: determine a corresponding LBT mechanism, LBT mechanism parameter set or category of LBT mechanism parameter set based on different priorities contained in the priority information in accordance with a predetermined correspondence. The priority information can include a QoS priority for a traffic type, a priority of a channel, a priority of a signal, a priority of a logical channel, and/or the priorities of the channel, signal and logical channel.

In an embodiment of the present disclosure, the apparatus can further include: an adjusting unit configured to, after the determining unit has determined the corresponding LBT mechanism, LBT mechanism parameter set or category of LBT mechanism parameter set in accordance with the predetermined correspondence: determine more specific parameters for the LBT mechanism based on the related indication information.

In an embodiment of the present disclosure, the apparatus can further include: an adjustment processing unit configured to, when performing contention-based channel access based on the determined LBT mechanism and/or LBT mechanism parameter set: select, when the contention-based access has failed once, an LBT mechanism and/or an LBT mechanism parameter set corresponding to a higher priority level based on the priority information for subsequent contention-based channel access; select, when the contention-based access has succeeded once, an LBT mechanism and/or an LBT mechanism parameter set corresponding to a lower priority level based on the priority information for subsequent contention-based channel access; select, when the contention-based access based on the LBT mechanism and/or LBT mechanism parameter set has failed for a first predetermined threshold number of times, an LBT mechanism parameter set having a smaller CW size and/or a shorter time length of CCA, or a more simplified or faster LBT mechanism for contention-based channel access; or select, when the contention-based access based on the LBT mechanism and/or LBT mechanism parameter set has succeeded for a second predetermined threshold number of times, an LBT mechanism parameter set having a larger CW size and/or a longer time length of CCA, or a more complicated LBT mechanism for contention-based channel access. The first predetermined threshold number and the second first predetermined threshold number can be predefined, obtained based on statistics, or indicated by a base station.

In an embodiment of the present disclosure, the apparatus can further include: a retransmission adjusting unit configured to adjust an LBT mechanism and/or an LBT mechanism parameter set to a retransmission of data to be transmitted, such that different LBT mechanisms and/or LBT mechanism parameter sets are determined for an initial transmission and the retransmission.

The retransmission adjusting unit can be configured to: determine the LBT mechanism and/or LBT mechanism parameter set for the retransmission such that, when compared with the LBT mechanism and/or LBT mechanism parameter set selected for the initial transmission, a different LBT mechanism or the same LBT mechanism with a smaller CW size and/or a shorter time length of CCA is determined for the retransmission.

The determining unit can further be configured to, for a plurality of successive uplink subframes: determine to use the same LBT mechanism or LBT mechanism parameter set or different LBT mechanisms or LBT mechanism parameter sets for the respective uplink subframes.

The determining unit can further be configured to, for same-carrier scheduling and for a plurality of successive uplink subframes: determine, before the first uplink subframe is transmitted, to use a fast LBT mechanism and LBT mechanism parameter set for fast contention-based channel access; and determine, for each of subsequent uplink subframes, to use a faster LBT mechanism and LBT mechanism parameter set than the LBT mechanism and LBT mechanism parameter set used for the previous uplink subframe, for fast contention-based channel access. The fast LBT mechanism or LBT mechanism parameter set determined for the first uplink subframe is configured with a number of OFDM symbols.

The determining unit can further be configured to, for same-carrier scheduling: determine, before the first uplink subframe is transmitted, to use a fast LBT mechanism and LBT mechanism parameter set for fast contention-based channel access; and determine, for each of subsequent uplink subframes, not to use any LBT mechanism and LBT mechanism parameter set for fast contention-based channel access.

The determining unit can further be configured to, for same-carrier scheduling and for a plurality of successive uplink subframes: determine, before the first uplink subframe is transmitted, to use a fast LBT mechanism and LBT mechanism parameter set for fast contention-based channel access; and determine, for each of subsequent uplink subframes, to use an LBT mechanism and an LBT mechanism parameter set having the same speed as the LBT mechanism and LBT mechanism parameter set used for the first uplink subframe, for fast contention-based channel access. The fast LBT mechanism and LBT mechanism parameter set determined for the first uplink subframe are configured with a number of OFDM symbols, and the fast LBT mechanism and LBT mechanism parameter set determined for each of the subsequent uplink subframes are configured with one OFDM symbol.

The determining unit can further be configured to, for cross-carrier scheduling and for a plurality of successive uplink subframes: determine, before the first uplink subframe is transmitted, to use an LBT Cat4 mechanism when no data is to be transmitted in downlink and uplink grant information is transmitted over a licensed carrier; and determine, for each of subsequent uplink subframes, to use a LBT Cat4 mechanism having a smaller CW than the LBT Cat4 mechanism used for the previous uplink subframe, or a more simplified LBT mechanism.

The determining unit can further be configured to, for cross-carrier scheduling: determine, before the first uplink subframe is transmitted, to use an LBT Cat4 mechanism when no data is to be transmitted in downlink and uplink grant information is transmitted over a licensed carrier; and determine, for each of subsequent uplink subframes, to apply no LBT mechanism and/or LBT mechanism parameter set for fast contention-based channel access.

The determining unit can further be configured to, for cross-carrier scheduling and for a plurality of successive uplink subframes: determine, before the first uplink subframe is transmitted, to use an LBT Cat4 mechanism when no data is to be transmitted in downlink and uplink grant information is transmitted over a licensed carrier; and determine, for each of subsequent uplink subframes, to use a LBT Cat4 mechanism having a smaller CW than the LBT Cat4 mechanism used for the previous uplink subframe, or a more simplified LBT mechanism. The LBT Cat4 mechanism determined for the first uplink subframe is configured with a number of OFDM symbols, and the LBT Cat4 mechanism or the more simplified LBT mechanism determined for each of the subsequent uplink subframes is configured with one OFDM symbol.

In an embodiment of the present disclosure, the apparatus can further include: a position determining unit configured to, for a plurality of successive uplink subframes: using the first uplink subframe as a position for applying the LBT mechanism and/or LBT mechanism parameter set before the second uplink subframe; and using, for each of subsequent uplink subframes, the last OFDM symbol of the previous uplink subframe as a position for applying the LBT mechanism and/or LBT mechanism parameter set for that uplink subframe.

In an embodiment of the present disclosure, the apparatus can further include: an obtaining unit configured to obtain a position of an uplink subframe in a transmission burst or apply the LBT mechanism and/or LBT mechanism parameter set by:

for a fixed frame structure:
applying, by the transmitting device, the LBT mechanism and/or LBT mechanism parameter set based on a position of a subframe in which it is scheduled, in accordance with a predefined rule, or for a flexible uplink/downlink subframe structure:
notifying, by a base station, to the transmitting device explicitly via an indication message whether a scheduled subframe is the first subframe or a subframe that is a particular number of subframes behind the first subframe, or indicating, by the base station, to the transmitting device via dynamic Downlink Control Information (DCI) the LBT mechanism and/or LBT mechanism parameter set to be applied on the scheduled subframe.

In an embodiment of the present disclosure, the apparatus can further include: a priority policy unit configured to, when there is a plurality of different priority levels in a burst transmitted from a transmitted device: determine the LBT mechanism and/or LBT mechanism parameter set in accordance with a predetermined priority policy.

Optionally, the LBT mechanism or LBT mechanism parameter set can be obtained by one of: determining the LBT mechanism or LBT mechanism parameter set based on information on a subframe in which a User Equipment (UE) is scheduled, determining the LBT mechanism or LBT mechanism parameter set based on Downlink Control Information (DCI) signaling transmitted from a base station to the UE, or determining the LBT mechanism or LBT mechanism parameter set based on higher layer Radio Resource Control (RRC) signaling.

Optionally, the information on the subframe in which the UE is scheduled can be determined based on physical layer DCI signaling.

Optionally, for a plurality of uplink subframes or when a plurality of successive subframes is scheduled:

an LBT Cat4 is applied on the first uplink subframe and an LBT Cat2 is applied on a plurality of subsequent uplink subframes, the LBT Cat2 is applied on the first uplink subframe and the LBT Cat2 is applied on a plurality of subsequent uplink subframes, the LBT Cat4 is applied on the first uplink subframe and the LBT Cat4 is applied on a plurality of subsequent uplink subframes, the LBT Cat4 is applied on the first uplink subframe and, for each of a plurality of subsequent uplink subframes, a smaller Contention Window (CW) is applied than the previous subframe, the LBT Cat4 is applied on the first uplink subframe and no LBT is applied on a plurality of subsequent uplink subframes, or the LBT Cat2 is applied on the first uplink subframe and no LBT is applied on a plurality of subsequent uplink subframes.

Optionally, for a plurality of uplink subframes or when a plurality of successive subframes is scheduled:

when an LBT has succeeded on an uplink subframe, no LBT is applied on subsequent uplink subframes, when an LBT has succeeded on an uplink subframe, an LBT is applied on subsequent uplink subframes in accordance with an LBT mechanism or LBT mechanism parameter set signaled by a base station, when an LBT has failed on an uplink subframe, an LBT is applied on the next uplink subframe in accordance with the same LBT mechanism or LBT mechanism parameter set as the one applied on that uplink subframe, when an LBT has failed on an uplink subframe, an LBT is applied on the next uplink subframe in accordance with an LBT mechanism or LBT mechanism parameter set configured by the base station, when an LBT has failed on an uplink subframe, an LBT is applied on the next uplink subframe in accordance with a preconfigured LBT mechanism or LBT mechanism parameter set, or when an LBT has failed on an uplink subframe, an LBT is applied on the next uplink subframe in accordance with a default LBT mechanism or LBT mechanism parameter set.

Optionally, when a (UE has failed successively for a number of times in accessing a channel in accordance with a configured LBT mechanism or LBT mechanism parameter set, an LBT priority, the LBT mechanism or the LBT mechanism parameter set can be adjusted based on one of:
  an indication signaled by a base station,
  a measurement of feedback information,
  a measurement of interference condition, or
  a priority of at least one of: a transmitted channel, a transmitted signal, a transmitted logical channel, or a type of transmitted traffic.

Optionally, an IE field for indicating the LBT mechanism or LBT mechanism parameter set can be added in the physical layer DCI signaling or the higher layer RRC signaling. The IE field can use n bits, where n is an integer larger than or equal to 1.

It is to be noted that, in the apparatus according to the embodiments of the present disclosure, the respective units can be provided at the base station or at the transmitting device, or can be standalone devices connected to the base station and the transmitting device, depending on actual network structures. When they are provided at separate locations, some information needs to be exchanged via network communications as established. Such modifications can be contemplated by those skilled in the art without inventive efforts.

A method for LBT mode switching is provided. The method includes: determining an LBT mechanism and/or an LBT mechanism parameter set based on related indication information and/or priority information and/or measurement information; and performing, by a transmitting device, contention-based channel access based on the determined LBT mechanism and/or LBT mechanism parameter set.

In the following, the method according to the embodiment of the present disclosure will be explained in detail with reference to specific embodiments. These embodiments are provided only for the purpose of illustrating the embodiments of the present disclosure, rather than limiting the scope of the embodiments of the present disclosure.

Embodiment 1

In this embodiment, there are two types of LBT mode switching:
Type 1: switching between different LBT mechanisms, and
Type 2: switching between different LBT mechanism parameter set within one LBT mechanism.

The LBT mechanisms include an LBT Cat2 mechanism, an LBT Cat4 mechanism and an LBT Cat3 mechanism. The LBT Cat2 mechanism is an LBT mechanism without random back-off. The LBT mechanism without random back-off can be categorized into: an LBT Cat2 in which only one CCA is performed for contention-based channel access, and an enhanced LBT Cat2 in which more than one CCA is performed for contention-based channel access. In the LBT Cat2 mechanism, each CCA can have a time length of 34 μs, 25 μs, 20 μs, 16 μs, 9 μs or 4 μs. The time length of the CCA can be predefined, indicated by a base station, notified via RRC signaling, determined based on different QoS levels, determined based on priorities of different channels/signals/logical channels, or determined based on the related indication information provided according to the embodiment of the present disclosure. Here, the term "predefined" means it is determined empirically by those skilled in the art. Typically, a higher QoS level (i.e., a lower priority index) corresponds to a shorter time length of the CCA and a higher priority of channel/signal/logical channel corresponds to a longer time length of the CCA.

The LBT Cat4 mechanism is an LBT mechanism with random back-off having a variable CW size. The set of parameters for the LBT Cat4 mechanism includes a first CCA; a random back-off value, N; a minimum CW, CWmin; a maximum CW, CWmax; and a defer period. The defer period consists of n by 9 μs plus 16 μs or 16 μs plus n by 9 μs, where n is a natural number.

Preferably, the first CCA (e.g., the first CCA) can have a time length of 34 μs (16 μs+2*9 μs or 9 μs+(16 μs+16 μs)), 25 μs or 9 μs. The random back-off value N is a value in an interval of [0, q−1], where q is a value ranging from CWmin to CWmax. For the uplink LBT Cat4 mechanism, the value of n in the defer period can be in a range of [0, 2]. Optionally, the value of n can be 1 as an empirical value. Further, in order to allow a transmitting device to access the channel fast, n can be configured as 0. In order to align it with the time length of Distributed Inter-Frame Spacing (DIFS) detection in the Wi-Fi system, the value of n can be 2. The LBT Cat2 mechanism is a special case of LBT Cat4 when the random back-off value in the LBT Cat4 is 0.

The LBT Cat3 mechanism is an LBT mechanism with random back-off having a fixed CW size. Preferably, the LBT Cat3 mechanism is a special case of LBT Cat4 when CWmin=CWmax in the LBT Cat4.

The switching between LBT mechanism parameter sets includes switching between LBT parameter sets having different time lengths of CCA or different CW sizes, or between different LBT mechanisms.

Here, the switching between the above respective LBT mechanisms or LBT mechanism parameter sets can be triggered in a defined condition or situation, including different CW sizes, different n values in the defer period and/or different time lengths of CCA between different parameter sets.

Embodiment 2

In this embodiment, the related indication information is a size of data packet to be transmitted. The LBT mechanism and/or LBT mechanism parameter set can be determined based on the related indication information as follows.

A set of sizes for data to be transmitted corresponding to respective LBT mechanisms and/or LBT mechanism parameter sets can be preconfigured. The LBT mechanism and/or LBT mechanism parameter set corresponding to the size of data packet to be transmitted falls can be selected for contention-based channel access. In this example, the set of sizes for data to be transmitted may include intervals: [x1, x2], [x3, x4], [x5, x6] and [x7, x8]. The respective intervals for sizes of data to be transmitted may partially overlap or not overlap each other. Typically, an interval has a minimum value smaller than or equal to a minimum value in its previous interval, and a maximum value larger than a maximum value in its previous interval. This embodiment will be explained in detail with reference to an example where the size of data packet to be transmitted falls into the respective intervals for sizes of data to be transmitted.

In this embodiment, when the size (A) of data packet to be transmitted falls into different intervals for sizes of data to be transmitted, the corresponding LBT mechanisms and/or LBT mechanism parameter sets can be selected. When the size of data packet to be transmitted by a transmitting device (e.g., an LAA UE in this embodiment) falls into [x1, x2], the LAA UE can use the LBT Cat2 mechanism in which only one CCA is performed before transmission. The main reason for selecting the LBT Cat2 mechanism is that the data packet to be transmitted is not large and, even if the LBT mechanism fails, there would not be a severe waste of resources. Here, the size of data packet to be transmitted mainly configured by a base station depending on the transmitting device. In addition, the LBT Cat2 mechanism can allow the transmitting device to perform fast contention-based channel access, so as to transmit data packets. When the size (A) of data packet to be transmitted falls into [x3, x4], the LAA UE can use the LBT Cat2 mechanism in which two or more CCAs are performed before transmission, so as to provide more than one opportunity for channel access, thereby ensuring that the transmitting device can successfully transmit the data in the size of data packet to be transmitted in this interval. When the size (A) of data packet to be transmitted falls into [x5, x6], the LAA UE can use the LBT Cat3 mechanism before transmission. When the size (A) of data packet to be transmitted falls into [x7, x8], the LAA UE can use the LBT Cat4 mechanism before transmission. In this embodiment, the LBT mechanism is selected, based on the size of data packet to be transmitted, for contention-based channel access. When the data packet to be transmitted is large, the LBT mechanism having a long time length of CCA or a large CW size will be selected. Different LBT mechanisms can be selected flexibly depending on the size of data packet to be transmitted. In this way, it is possible to ensure an efficient and fast transmission of data, as well as a proper utilization of resources.

In this embodiment, when the size (A) of data packet to be transmitted falls into different intervals, different LBT mechanism parameter sets can be selected for contention-based channel access. In particular, different values of CWs in the parameter sets can be selected for contention-based channel access. When the size (A) of data packet to be transmitted falls into [x1, x2], the LAA UE can use the LBT Cat4 mechanism having the minimum CW before transmission. For example, the minimum CW, CWmin, can be 1, the maximum CW, CWmax, can be 3, and the value of n in the defer period can be 1 or 2. Of course, in order to provide a faster contention-based channel access, n can be configured as 0. When the size (A) of data packet to be transmitted falls into [x3, x4], the LAA UE can use the LBT Cat4 mechanism having a CW larger than the minimum CW before transmission, and so on. As the size of data packet increases, the CW of the corresponding LBT Cat4 increases. The intervals for sizes of data packet to be transmitted may partially overlap or not overlap. The end point values of the intervals have an increasing trend.

Embodiment 3

In this embodiment, the related indication information is a number of successive scheduled subframes. The LBT mechanism and/or LBT mechanism parameter set can be determined based on the related indication information in a similar way that the LBT mechanism and/or LBT mechanism parameter set is determined based on the size of data packet to be transmitted.

In particular, a set of numbers of successive scheduled subframes corresponding to the respective LBT mechanisms and/or LBT mechanism parameter sets can be preconfigured. The LBT mechanism and/or LBT mechanism parameter set corresponding to the number of successive scheduled subframes falls can be selected for contention-based channel access. The principles associated with values and overlapping for the intervals for numbers of successive scheduled subframes are the same as those for the intervals for sizes of data to be transmitted. In this embodiment, it is assumed that the set of numbers of successive scheduled subframes include intervals: [m1, m2], [m3, m4], [m5, m6] and [m7, m8].

When the number (A) of successive scheduled subframes falls into [m1, m2], the LAA UE can use the LBT Cat2 mechanism in which only one CCA is performed before transmission. When the number (A) of successive scheduled subframes falls into [m3, m4], the LAA UE can use the LBT Cat2 mechanism in which two or more CCAs are performed before transmission. Similarly, when the number (A) of successive subframes in which the UE is scheduled falls into [m5, m6], the LAA UE can use the LBT Cat3 mechanism before transmission. When the number (A) of successive subframes in which the UE is scheduled into [m7, m8], the LAA UE can use the LBT Cat4 mechanism before transmission. Here, the end point values of each interval can be different (i.e., for each interval, the left end point value can be smaller than the right end point) or the same. The number of uplink transmission subframes or the length of the uplink transmission burst can be 1 ms, 2 ms, 3 ms, 4 ms, 5 ms or larger than 5 ms, depending on the specific frame structure. Preferably, m1 and/or m2 can be configured as 1 ms or 2 ms. When the available uplink LBT mechanisms include the LBT Cat2 and LBT Cat4 mechanisms only, different sizes of data packet may correspond to the LBT Cat2 and the LBT Cat4 mechanisms having successively increasing CW values. That is, the LBT Cat2 and the LBT Cat4 having different CW sizes correspond to different intervals for numbers of successive scheduled subframes. Alternatively, when only the LBT Cat4 mechanism is available before uplink transmission, the LBT mechanism parameter set can be selected by: selecting different CW sizes in the LBT mechanism parameter set based on different intervals for numbers of successive scheduled subframes into which the number (A) of successive scheduled subframes falls. In particular, the LBT mode can be switched in the following manner:

When the number (A) of successive scheduled subframes falls into [m1, m2], the LAA UE can use a minimum CW (CWmin) of 1 and a maximum CW (CWmax) of 3 before transmission, and the value of n in the defer period can be 0, 1 or 2, depending on actual situations. When the number (A) of successive scheduled subframes falls into [m3, m4], the LAA UE can use a minimum CW larger than that used for [m1, m2] before transmission, and so on.

Embodiment 4

In this embodiment, the related indication information is one or more bits configured in DCI signaling. The LBT mechanism and/or LBT mechanism parameter set can be determined based on the related indication information by: preconfiguring bit information and/or numbers of bits configured in the DCI signaling corresponding to the respective LBT mechanisms and/or LBT mechanism parameter sets; and selecting the LBT mechanism and/or LBT mechanism parameter set corresponding to the bit information and/or the number of bits configured in the DCI signaling for contention-based channel access.

Preferably, different bit information configured in the DCI signaling can refer to values of a specified IE field, e.g., integer values from 0 to N, corresponding to different LBT mechanisms and/or LBT mechanism parameter sets. Assuming that the IE field contains 3 bits, nine (0-8) LBT mechanisms and/or LBT mechanism parameter sets can be determined. For example, when the IE field has a value of 000, it indicates to the UE that the LBT Cat2 in which only one CCA is performed can be selected; when the IE field has a value of 001, it indicates to the UE that the LBT Cat2 mechanism in which more than one CCA is performed can be selected; when the IE field has a value of 010, it indicates to the UE that the LBT Cat4 mechanism or the LBT Cat4 mechanism having the minimum CW can be selected, and so on. As the value of the IE field increases, the CW size increases successively. The LBT mechanism parameter set can include other parameters such as a defer period n, a slot length of the first CCA, and the like.

If the DCI signaling contains a random back-off value N in the interval of [0, q−1] and a transmitting device can correctly decode the DCI signaling, then the transmitting device can determine the LBT mechanism before transmission based on the random back-off value N. Here, q has a value in the interval of [CWmin, CWmax] corresponding to the LBT Cat4 mechanism. If the DCI signaling carries the random back-off value N but the transmitting device fails to decode it, the transmitting device cannot determine whether it did not obtain the random back-off value N because it failed to decode the DCI signaling correctly or because the DCI signaling did not carry the value N at all. In this case, the transmitting device can use a predetermined LBT mechanism for contention-based channel access.

Embodiment 5

In this embodiment, the related indication information is a broadcast scheme. The LBT mechanism and/or LBT mechanism parameter set can be determined based on the related indication information by: selecting the LBT mechanism and/or LBT mechanism parameter set based on an identity of an LBT mechanism or a category of an LBT mechanism parameter set broadcasted to a transmitting device.

In particular, the broadcast scheme means that the LBT mechanism and/or LBT mechanism parameter set to be selected for contention-based channel access can be broadcasted directly to the transmitting device. For example, a base station can broadcast to the transmitted device a random back-off value N=0 in an LBT mechanism parameter set. The transmitting device can know from the parameter that it needs to apply the LBT Cat2 without random back-off before a scheduled subframe. Alternatively, the enhanced LBT Cat2 mechanism can be used. In this embodiment, a slot length of CCA can be predefined or configured by the base station, or can be a default value. Similarly, when a random back-off value N=3 is broadcasted, the contention-based channel access can be performed in accordance with the LBT Cat4 mechanism with the random back-off value N=3 in an ECCA process.

Embodiment 6

In this embodiment, the related indication information is a time-domain length of a gap between an uplink burst and a downlink burst. The time-domain length of the gap between the uplink burst and the downlink burst can be signaled from a base station, determined based on the respective lengths of the uplink burst and the downlink burst (which is a common practice in the art), or preconfigured (e.g., based mainly on an empirical value).

In particular, when the time-domain length of the gap between the uplink burst and the downlink burst is smaller than 16 µs or 25 µs, no LBT mechanism may be applied before transmission of the uplink transmission burst. When the time-domain length of the gap between the uplink burst and the downlink burst is one OFDM symbol and the start position of contention-based channel access using a selected LBT mechanism is in the second half of one OFDM symbol, the LBT Cat2 mechanism can be used before data transmission. Alternatively, when only the LBT Cat4 mechanism can be used in the uplink, the transmitting device can use the LBT Cat4 having the minimum CW value before transmission. When the time-domain length of the gap between the uplink burst and the downlink burst is one OFDM symbol and the LBT starts in the middle interval of one symbol, the transmitting device can use the LBT Cat2 mechanism in which more than one CCA is performed before transmission. Here, when there are two LBT modes, e.g., LBT Cat2 mechanism and LBT Cat4 mechanism, in the uplink, the LBT Cat2 or enhanced LBT Cat2 can be used in the first uplink subframe in the uplink transmission burst, while the LBT Cat2 is used, or no LBT mechanism can be performed, in subsequent subframes, so as to improve the probability of uplink channel access and the uplink resource efficiency. Alternatively, when there is only one LBT Cat4 mechanism in the uplink, the LBT Cat4 having as small CW as possible can be used in the first uplink subframe in the uplink transmission burst. Optionally, the same LBT Cat4 parameter configuration as the first subframe, or the LBT Cat4 mechanisms having successively decreasing CWs, can be used in the subsequent uplink subframes. This is also the case when the time-domain length of the gap between the uplink burst and the downlink burst is one OFDM symbol and the LBT starts in the first half of one symbol. Similarly, the above scheme also applies when the time-domain length of the gap between the uplink burst and the downlink burst is longer than one OFDM symbol, e.g., the LBT Cat2 or the LBT Cat4 having as small CW as possible (e.g., having CWmin=1, CWmax=3 and n=1 in the defer period) can be used in the first uplink subframe.

In another case, the LBT mechanism and/or LBT mechanism parameter set to be used before transmission can be indicated directly by the time-domain length of the gap between the uplink burst and the downlink burst. For example, when the time-domain length of the gap is smaller than a predetermined threshold, which can be 16 µs or 25 µs, no LBT mechanism may be applied before transmission of the uplink transmission burst, and no LBT mechanism may be applied in other uplink subframes in the burst. Optionally, in order to avoid the hidden station problem, an LBT Cat2 process can be performed. When the time-domain length of the gap is larger than 16 µs or 25 µs, preferably the LBT Cat2 mechanism can be used for contention-based channel access. If there is only one LBT mechanism, e.g., LBT Cat4, in the uplink, the LBT Cat4 process having as small CW as possible can be used due to the short time-domain length of the gap. For each subsequent subframe, an LBT process having a smaller CW than its previous subframe can be used. For example, the LBT Cat2 can be used, or no LBT can be applied, in the last uplink subframe in the burst. Optionally, in the subsequent subframes, the same LBT mechanism or LBT mechanism parameter set as the first subframe can be used for contention-based channel access. Alternatively, no LBT mechanism or LBT mechanism parameter set can be applied.

Figure 3:
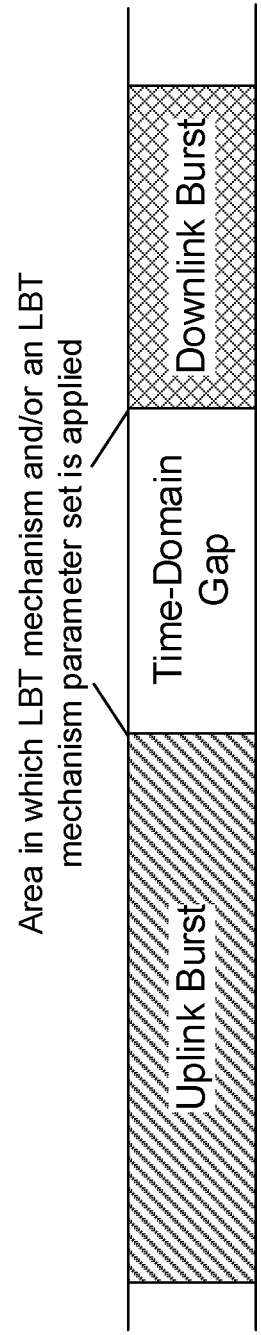
FIG. 3 is a schematic diagram showing a position of an area in which an LBT mechanism and/or an LBT mechanism parameter set is applied according to a sixth embodiment of the present disclosure.

FIG. 3 is a schematic diagram showing a position of an area in which an LBT mechanism and/or an LBT mechanism parameter set is applied according to Embodiment 6 of the present disclosure. As shown in FIG. 3, contention-based channel access can be performed using an LBT mechanism and/or LBT mechanism parameter set selected corresponding to the time-domain position or time length of the gap between the uplink burst and the downlink burst.

Embodiment 7

The switching related information is an identity in an LBT list signaled from a base station. The LBT mechanism and/or LBT mechanism parameter set can be determined based on the related indication information by: preconfiguring an information list of LBT mechanisms for switching, to be shared between that transmitting device and a base station; and determining, by a transmitting device, the LBT mechanism and/or LBT mechanism parameter set based on list information signaled from the base station.

Table 1 is the list information shared between the base station and the transmitting device according to Embodiment 7 of the present disclosure. The LBT mechanisms for contention-based channel access included in the list are shown in Table 1.

TABLE 1

| Index | Candidate LBT mechanism for uplink |
|---|---|
| 1 | LBT Cat2 mechanism in which only one CCA is performed |
| 2 | LBT Cat2 mechanism in which more than one CCA is performed |
| 3 | LBT Cat4 having a CW interval of [P1, P2] |
| 4 | LBT Cat4 having a CW interval of [S1, S2] |
| 5 | LBT Cat4 having a CW interval of [K1, K2] |
| . . . | LBT Cat4 having a CW interval of . . . |

Here, the start position of CCA in the LBT Cat2 can be a fixed position or a start position randomly selected in time-domain available for LBT.

When the LBT mechanism for contention-based channel access is an LBT Cat4 mechanism, the list information shared between the base station and the transmitting device includes various LBT mechanism parameter sets for the LBT Cat4 mechanism as determined based on CW sizes, as shown in Table 2.

TABLE 2

| Index | Candidate LBT mechanism for uplink |
|---|---|
| 1 | LBT Cat4 having a CW interval of [P1, P2] |
| 2 | LBT Cat4 having a CW interval of [S1, S2] |
| 3 | LBT Cat4 having a CW interval of [K1, K2] |
| . . . | LBT Cat4 having a CW value of . . . |

In Table 1 and Table 2, the values of CW sizes may successively increase and the value of n in the defer period in the LBT Cat4 mechanism parameter set can preferably be 1. Alternatively, the value of n can be 0 or 2. Further, the values of n in the LBT Cat4 candidates in the list may be the same or different. Optionally, for the first uplink subframe, channel access can be performed as scheduled or as indicated by the base station. Preferably, for cross-carrier scheduling, when there is no data to be transmitted in downlink, a UE can obtain using a mechanism or determine autonomously a parameter having a large CW value in the selectable information list for contention-based channel access. For the subsequent uplink subframes, the contention-based LBT mechanisms having successively decreasing CW values, or more simplified LBT mechanisms, can be used. Alternatively, for the subsequent uplink subframes, the same LBT mechanism or LBT mechanism parameter set as the first uplink subframe can be used for contention-based channel access, or no LBT mechanism or LBT mechanism parameter set will be applied.

When there are only LBT mechanisms for contention-based access in the LBT information list, after the UE has obtained the LBT mechanism to be used, it can perform the contention-based channel access further based on an LBT parameter configuration corresponding to a traffic type of data to be transmitted or a priority of a transmitted channel or signal. Alternatively, it can further determine the specific LBT parameter set in the LBT mechanism based on the length of the transmission burst, the index of the uplink subframe in the burst, a retransmission or an initial transmission, so as to perform the channel access.

Optionally, if the UE has failed for a number of times in channel access in accordance with the LBT mechanism or LBT mechanism parameter set, it can improve or use a more simplified LBT mechanism or an LBT Cat4 having a smaller CW or raise the priority (thereby using an LBT mechanism or LBT mechanism parameter configuration corresponding to the higher priority), autonomously or in accordance with Channel State Information (CSI) within a predetermined time length, a Reference Signal Received Power (RSRP) within a predetermined time length, a Reference Signal Received Quality (RSRQ) within a predetermined time length, Hybrid Automatic Repeat reQuest—Acknowledge (HARQ-ACK) information, or information on a measured interference.

Similarly, if the UE has succeeded for a number of times in channel access in accordance with the LBT mechanism or LBT mechanism parameter set, in order to provide fair opportunities for contention-based access, the principle for handling contention-based channel access failures can also be applied to adjust the determined LBT mechanism or LBT mechanism parameter set.

With the above information list, the transmitting device can perform contention-based channel access using an LBT mechanism having an index in the information list as indicated by the base station to the transmitting device or an LBT mechanism selected autonomously by the transmitting device from the information list.

Embodiment 8

In this embodiment, the related indication information is a position of a scheduled subframe in a transmission burst or in uplink subframes, the LBT mechanism and/or LBT mechanism parameter set can be determined based on the related indication information by: preconfiguring positions of the scheduled subframe in the transmission burst or positions of the scheduled subframe in the uplink subframes corresponding to respective LBT mechanisms and/or LBT mechanism parameter sets; and determining the LBT mechanism and/or LBT mechanism parameter set based on the position of the scheduled subframe in the transmission burst or in the successive uplink subframes.

Preferably, respective LBT Cat4 mechanism parameter configurations can be selected in a descending order of CW size based on the position of the subframe in which the UE is scheduled in the uplink subframes in one transmission burst or in the uplink subframes. Optionally, an LBT mechanism without random back-off, or no LBT mechanism, can be applied in uplink subframes subsequent to the first uplink subframe. If the contention-based access in accordance with the LBT mechanism and/or LBT mechanism parameter set selected based on the position of the first uplink subframe has failed, in the next uplink subframe, the LBT mechanism and/or LBT mechanism parameter set corresponding to the subframe where the failure occurs can be used again, or a more simplified LBT mechanism or an LBT parameter configuration having a smaller CW can be used.

For example, for the first scheduled uplink subframe, CWmax=7, CWmin=5, and n=1. If the first subframe fails, the same configuration can still be used for the second scheduled uplink subframe. Alternatively, for the second scheduled uplink subframe, CWmax=4, CWmin=2, and n=1; CWmax=3 CWmin=1, and n=1; CWmax=1, CWmin=1, and n=1; and so on.

This embodiment will be explained with reference to an example where the transmitting device can only use the LBT Cat4 as its LBT mechanism for contention-based access in uplink. Optionally, when the random back-off value N is 0, the contention-based access mechanism is degraded into the LBT Cat2.

When a special subframe precedes the uplink subframe, preferably the LBT mechanism for contention-based access is the normal LBT Cat4 mechanism. The normal LBT Cat4 mechanism is a process of a first CCA plus a defer period plus an ECCA process having a random back-off process N. The normal LBT Cat4 mechanism has a maximum CW value smaller than the CW of the downlink LBT mechanism. The maximum CW can be 1024 at maximum and 1 at minimum. For example, the minimum CW can be 15, the maximum CW can be 31 or 63, and the component n in the defer period can have a maximum configurable range of [0, 2]. Preferably, the value of n can be 1, in order to avoid interference with neighboring nodes as much as possible, reduce the collision probability and increase the success rate of channel access by the device.

For a downlink subframe or a time-domain length of a gap precedes the first uplink subframe in the transmission burst or the first scheduled uplink subframe, preferably the LBT mechanism for contention-based access is the normal LBT Cat4 mechanism. It is to be noted here that the maximum CW of the LBT mechanism is in a smaller CW range than that for the special subframe. For example, the minimum CW (CWmin) can be 7, the maximum CW (CWmax) can be 15, and the component n in the defer period can have a maximum configurable range of [0, 2]. Preferably, the value of n can be 1.

For the second uplink subframe in the transmission burst or the second uplink subframe in which the UE is successively scheduled, preferably the LBT mode is selected as the LBT Cat4 mechanism having a CW smaller only than the maximum CW value. For example, the minimum CW (CWmin) can be 3, the maximum CW (CWmax) can be 7, and the component n in the defer period can have a maximum configurable range of [0, 2]. Preferably, the value of n can be 1.

Similarly, for the third uplink subframe in the transmission burst or the third uplink subframe in which the UE is successively scheduled, preferably the LBT mechanism is selected as the LBT Cat4 mechanism having a CW smaller only than the CW values for the first and second uplink subframes. For example, the minimum CW (CWmin) can be 1, the maximum CW (CWmax) can be 3, and the component n in the defer period can have a maximum configurable range of [0, 2]. Preferably, the value of n can be 1.

For the fourth uplink subframe in the transmission burst or the fourth uplink subframe in which the UE is successively scheduled, preferably the LBT mechanisms is selected as the LBT Cat4 mechanism having a CW smaller only than the CW values for the first, second and third uplink subframes, the LBT Cat3 having a fixed CW (i.e., CWmax=CWmin), or the LBT Cat2 having a random back-off value N=0. For example, the minimum CW (CWmin) can be 1, the maximum CW (CWmax) can be 1, and the value of N may be in the interval of [0, q−1], where q can have a maximum value of 1 (i.e., the random back-off value N can only be 0). The component n in the defer period can have a maximum configurable range of [0, 2]. Preferably, the value of n can be 1. Alternatively, the minimum CW and the maximum CW can each be 2. Similarly, LBT Cat2 detection slots having different time lengths can be further used, or the enhanced LBT Cat2 can be used. In the above cases, the values of the component n in the defer period can be the same or can be configured differently in different situations.

When the same or different UEs are successively scheduled in a number of subframes, the normal LBT Cat4 can be used for the first uplink subframe and no LBT may be applied for the subsequent subframes. Alternatively, the normal LBT Cat4 can be used for the first uplink subframe and the LBT Cat4 mechanisms having successively decreasing CW sizes can be applied for the subsequent subframes for contention-based channel access. Alternatively, the normal LBT Cat4 can be used for the first uplink subframe and the LBT Cat2 or a fast LBT mechanism can be used for the subsequent subframes. Alternatively, the LBT Cat2 mechanism can be used for the first uplink subframe and no LBT mechanism may be applied for the subsequent subframes. Alternatively, the LBT Cat2 mechanism can be used for the first uplink subframe and the LBT Cat2 mechanism and/or no LBT mechanism may be applied for the subsequent subframes. Alternatively, the above described scheme can be used.

Embodiment 9

In this embodiment, one or more random back-off values can be configured. It can be determined to use the configured random back-off value via same-carrier scheduling or cross-carrier scheduling based on a position of a scheduled uplink subframe or a length of a transmission burst, or based on whether a Pcell has received grant information.

A base station can configure a transmitting device with the same time length of CCA and different UEs can be configured with different CCA positions. In the former case, different UEs can be configured with different CCA positions for mitigating unfairness in contention-based access, thereby further improving the overall uplink system performance. For a transmitting device that first detects a channel to be idle, if a start boundary of a data transmission has not arrived at the time when the channel is successfully detected to be idle, it can transmit a reservation signal or an initial signal for identification by UEs to be multiplexed in the same cell, so as to achieve the multiplexing. In the latter case, when a UE detects a channel to be busy during random back-off, it can reconfigure the random back-off value in the next channel detection or when a particular threshold is exceeded. In this case, the reconfigured random back-off value N is smaller than the current value of N. With the method in this embodiment, the base station can accelerate the decreasing of the random back-off value N, so as to allow fast channel access by an LAA device, thereby improving the channel access rate. If a device has successively detected the channel to be busy for more than a predetermined threshold time length during a time period, the N value can be adjusted again. If a device has successively detected the channel to be busy more than a predetermined threshold number of times, the N value can be adjusted too. The predetermined thresholds can be determined empirically by those skilled in the art.

Embodiment 10

In this embodiment, the related indication information is a carrier scenario for transmission of a scheduling instruction. The LBT mechanism and/or LBT mechanism parameter set can be determined based on the related indication information by: determining the LBT mechanism and/or LBT mechanism parameter set based on same-carrier scheduling or cross-carrier scheduling.

Preferably, for the uplink, the existing scheduling mechanisms include same-carrier scheduling and cross-carrier scheduling. Here, different LBT mechanisms or different types of CW values in a specific LBT mechanism can be selected for the same-carrier scheduling and the cross-carrier scheduling. Of course, the same mechanism or the same CW parameter configuration can be selected. When different mechanisms are selected, for the same-carrier scheduling, a base station has applied the downlink LBT Cat4 mechanism once before transmitting scheduling grant information. Hence, when a transmitting device receives the grant information, it can select to apply a fast LBT mechanism before transmission of the first uplink subframe. Since a Wi-Fi system performs only one LBT process before data transmission and in an LAA system a base station in the same-carrier scheduling mode has applied an LBT mechanism similar to the Wi-Fi system once, when the UE receives the grant information, it can apply one fast LBT mechanism before transmission. This is advantageous in avoiding the hidden node problem. Optionally, when a time-domain length of a gap before an uplink or downlink transmission is smaller than a predetermined threshold, which can be 16 μs or 25 μs, a UE can select to apply no LBT mechanism or LBT mechanism parameter set. Here, the fast LBT mechanism can include the normal LBT Cat4 mechanism having its maximum CW smaller than the CW for the downlink LBT Cat4; the defer period+ECCA process; the direct ECCA process; the enhanced LBT Cat2; and the LBT Cat2. A fast LBT mechanism (which can be the same as or different from the fast LBT mechanism used for the first uplink subframe) can be used for the subsequent uplink subframes. For example, the defer period+ECCA process (CWmax=7, CWmin=5 and n=1) can be used for the first uplink subframe. The same defer period+ECCA process, or different fast LBT mechanisms, or the same fast LBT mechanism having different CW sizes or different time lengths of CCA, can be used for the subsequent, successive uplink subframes. For example, the direct ECCA process (CWmax=6, CWmin=4 and n=1) can be used for the second subframe. The enhanced LBT Cat2, LBT Cat2 or no LBT mechanism can be applied for the third subframe. Alternatively, the fast LBT mechanism can be applied only for the first uplink subframe, while no LBT mechanism is applied for the subsequent, successive uplink subframes.

For the cross-carrier scheduling, there are different cases where there is downlink data to be transmitted and where there is no downlink data to be transmitted.

When there is downlink data to be transmitted and uplink grant information is transmitted over a licensed carrier, the LBT mechanism applied in the first uplink subframe can be the same as that in the case of same-carrier scheduling.

When there is no downlink data to be transmitted and the uplink grant information is transmitted over a licensed carrier, as the base station transmits the uplink grant information over the licensed carrier, no LBT mechanism or LBT mechanism parameter set needs to be applied. Hence, after receiving the grant information, the UE needs to apply the normal LBT Cat4 mechanism before data transmission, so as to achieve a fair contention-based channel access with a Wi-Fi system. However, the maximum CW for the normal LBT Cat4 should be smaller than the CW for the downlink LBT Cat4. For subsequent uplink subframes, no LBT mechanism may be applied for transmission. Alternatively, the LBT Cat4 mechanism having a smaller CW than the previous subframe can be applied sequentially. When the LBT Cat4 and the LBT Cat2 are used in the uplink, for each of the subsequent uplink subframes, the LBT Cat4 process having a smaller CW than its previous subframe and/or an LBT Cat2 process can be performed. Alternatively, the LBT Cat2 can be applied for each of the subsequent uplink subframes. Alternatively, the successively decreasing CWs, the LBT Cat2 and/or no LBT can be applied. Alternatively, for each of the subsequent uplink subframes, the same LBT Cat4 can be applied and only the random back-off value N over available resources can be used.

Optionally, in this embodiment, after the LBT mechanism has been selected, different LBT parameter set configurations, including CWmax, CWmin, the component n in the defer period and the like, can be selected more specifically, depending on different QoS priority levels, different channel/signal priorities, or traffic information.

Embodiment 11

In this embodiment, the related indication information includes: a size of data packet to be transmitted, a number of successive scheduled subframes, one or more bits configured in DCI signaling, a broadcast scheme, a time-domain length of a gap between an uplink transmission burst and a downlink transmission burst, an identity in an LBT list signaled from a base station, a position of a scheduled subframe in a transmission burst or in uplink subframes, a length of one transmission burst, and/or a carrier scenario for transmission of a scheduling instruction. An LBT mechanism and/or an LBT mechanism parameter set is determined based on related indication information. Contention-based channel access is performed based on the selected LBT mechanism and/or LBT mechanism parameter set. When there are a number of LBT mechanisms in the uplink, the LBT mechanism for the contention-based channel access can be determined as described above. When there is only one LBT mechanism in the uplink, in this embodiment, the LBT mechanism parameter set for the contention-based channel access can also be determined as described above.

In this embodiment, priority information can include QoS priorities for different traffic types or priorities of different channels and/or signals and/or logical channels. Optionally, logical channels having different priority levels can be mapped to corresponding physical transmission channels, such that the physical transmission channels also have the respective priority levels. Here, among the logical channels in the uplink, Common Control Channel (CCCH), Dedicated Control Channel (DCCH) and Dedicated Traffic Channel (DTCH) are mapped to an uplink transmission channel known as Uplink Shared Channel (UL-SCH). Optionally, the priorities of the logical channels are, in descending order, as follows: Cell-Radio Network Temporary Identity (C-RNTI) from UL-CCCH or data to be transmitted (the highest priority); Buffer Status Report (BSR) and Medium Access Control (MAC) Control Element (CE) for BSR without padding; MAC CE for transmission Power Headroom (PHR) or extended PHR; data in any logical channel, except those for Uplink China Compulsory Certification (UL-CCC); and BSR with padding (the lowest priority).

When the LBT mechanism and/or LBT mechanism parameter set is determined based on the priority information, if there are a number of LBT mechanisms in the uplink, the LBT mechanism and/or LBT mechanism parameter set can be selected based on different priority information. When there is only one LBT mechanism in the uplink, the parameter set in the LBT mechanism can be selected based on different priority levels. Then, the contention-based channel access can be performed based on the LBT mechanism and/or LBT mechanism parameter set corresponding to the priority.

Here, it is assumed that a UE is to transmit only data of one traffic type, but has failed for a number of times successively in channel access in accordance with the selected LBT mechanism or LBT parameter set (e.g., perhaps the corresponding priority is low and thus a large CW value or a long CCA time length is used in the LBT mechanism). In this case, the following schemes can be applied according to this embodiment.

Scheme 1: The transmitting device senses and reports information on a measured interference or Channel State Information (CSI) to the base station, which decides to adjust the priority level of the LBT mechanism or LBT mechanism parameter set used for the UE to transmit the data of that traffic type. For example, if the LBT Cat4 mechanism having the largest CW was used in the failed contention-based access, the CW size can be reduced or the priority level can be raised by a certain level (which can be 1 by default) and thus the LBT mechanism or LBT mechanism parameter set can be adjusted. When there is only one LBT mechanism in the uplink, e.g., LBT Cat4, if the UE always uses the LBT Cat4 (CWmin=7, CWmax=15, and n=1 in the defer period) to transmit that type of traffic (assuming a priority of 3), it can use a smaller CW size or a higher priority in the next LBT (e.g., LBT Cat4 having CWmin=5, CWmax=7, and n=1 in the defer period) or the LBT mechanism parameter set corresponding to the higher priority, based on the measurement information. When there is a plurality of LBT mechanisms in the uplink, preferably a small CW value in a corresponding LBT mechanism or an LBT parameter set corresponding to a priority one or more levels higher can be used for contention-based channel access. In a suboptimal scheme, a more simplified fast-access LBT mechanism, such as the enhanced LBT Cat2 or the LBT Cat2, can be used. As a general principle, the priority level or the used LBT mechanism or LBT parameter set configuration can be further adjusted based on the reported measured interference or feedback information.

Scheme 2: When the contention-based access based on the LBT mechanism and/or LBT mechanism parameter set has failed for a first predetermined threshold number of times, the UE can raise the priority level according to a predefined rule. For example, a priority offset can be 1 and the first predetermined threshold number can be 5. If the UE has failed successively for 5 times in performing the LBT in accordance with the LBT mechanism or LBT parameter set corresponding to the priority 3, the priority can be raised by one priority level according to the predefined priority offset. That is, the LBT mechanism or LBT parameter set corresponding to the priority 2 will be used for the next contention-based channel access. Similarly, when the LBT has succeeded successively for a number of times, the above process for successive failures can also be used, except that the priority is lowered or the CW value is increased. In doing so, it is possible to reduce the probability of channel access, so as to give more opportunities for other devices to access the channel, thereby ensuring the fairness.

In this embodiment, the above process can also be applied at the base station. In Scheme 1, the base station can sense a measurement to trigger the adjustment of the LBT mechanism or LBT parameter set. The measurement may include: Channel State Information (CSI) within a predetermined time length, a Reference Signal Received Power (RSRP) within a predetermined time length, a Reference Signal Received Quality (RSRQ) within a predetermined time length, Hybrid Automatic Repeat reQuest—Acknowledge (HARQ-ACK) information, or information on a measured interference.

For an initial transmission and a retransmission, different LBT mechanisms can be applied (when there is a plurality of LBT mechanisms in the uplink), or an LBT mechanism parameter set can be selected accordingly (when there is only one LBT mechanism in the uplink). When the contention-based access based on the LBT mechanism and/or LBT mechanism parameter set has failed for the first predetermined threshold number of times, the LBT mechanism and/or LBT mechanism parameter set to be used for contention-based access in the retransmission can be adjusted using Scheme 1 or Scheme 2.

Embodiment 12

In this embodiment, a process to be performed when a plurality of different priority levels in a transmission burst, i.e., when priority information includes a plurality of priority levels, will be mainly described.

It is assumed that there are three transmitting devices scheduled in one transmission burst, corresponding to priority levels of 1 (the highest priority), 2 and 3 (the lowest priority), respectively. In turn, the priority levels of 1, 2 and 3 correspond to the following LBT parameter sets, respectively: LBT Cat4 having CWmin=1 and CWmax=3; LBT Cat4 having CWmin=4 and CWmax=5; and LBT Cat4 having CWmin=5 and CWmax=7. When there is a plurality of priorities in one transmission burst, an LBT mechanism and/or an LBT mechanism parameter set can be determined in accordance with a predetermined priority policy. There can be the following schemes.

Scheme 1: Each transmitting device performs contention-based channel access based on an LBT mechanism parameter set corresponding to the lowest priority. Here, it is assumed that UE1 corresponds to the priority 1 and UE2 corresponds to the priority 2. In this case, both UE1 and UE2 need to perform contention-based channel access based on an LBT mechanism parameter set for the priority 3 corresponding to UE3. In this way, UE1, which has the highest priority and would otherwise be likely to succeed in LBT and access an unlicensed carrier, performs LBT using the LBT parameter corresponding to the lowest priority and thus has a very high probability to fail in the contention. Hence, none of the three UEs may access the unlicensed carrier.

Scheme 2: Each transmitting device performs contention-based channel access based on an LBT mechanism parameter set corresponding to the second highest priority. In this way, it is possible to ensure that at least one UE can successfully access the unlicensed carrier.

Scheme 3: Each transmitting device performs contention-based channel access based on an LBT mechanism parameter set corresponding to the highest priority. In this way, it is possible to ensure that the plurality of UEs, or a plurality of traffic types and/or channels/signals, in the burst can access the unlicensed carrier, thereby allowing normal transmissions.

Scheme 4: The LBT mechanism parameter set corresponding to the highest priority is used, with q having a value of CWmin.

Scheme 5: Each transmitting device performs contention-based channel access based on a predetermined LBT mechanism or LBT parameter set corresponding to its priority. Optionally, this can be done in parallel in the time domain and by means of frequency division multiplexing in the frequency domain. Alternatively, this can be done in parallel in the time domain and across an entire bandwidth in the frequency domain.

Scheme 6: The transmitting devices perform contention-based channel access in a time division manner. Here, they may have common start time for performing LBT. When a channel is detected to be busy, their random back-off values N are frozen.

Embodiment 13

In this embodiment, a process to be performed when an LBT process is to be applied in a case where a transmitting device (or UE) is scheduled on different subframes and Resource Elements (REs) or Resources Blocks (RBs) at positions are scheduled on the different subframes will be described.

In particular, in this embodiment, it is assumed that the UE is scheduled in different RBs or REs in Subframe 1 and Subframe 2, respectively. In this case, an LBT mechanism or an LBT parameter set can be applied in accordance with one of the following schemes.

Scheme 1: The UE performs an LBT process on one or more OFDM symbols before Subframe 1 and over the entire bandwidth in the frequency domain. Before Subframe 2, a full-bandwidth LBT process can be performed. Alternatively, an LBT process can be performed over frequency-domain resources corresponding to scheduled resources in the second scheduled subframe, or no LBT process may be performed.

Scheme 2: The UE performs an LBT process on one or more OFDM symbols before Subframe 1 and over respective scheduled resources in the frequency domain. An LBT process can be performed before Subframe 2 and at frequency-domain positions of scheduled resources corresponding to Subframe 2, or no LBT process may be performed.

Scheme 3: The UE performs an LBT process on one or more OFDM symbols before Subframe 1 and at frequency-domain positions of scheduled resources corresponding to Subframe 1. An LBT process can be performed on the last one or more symbols in Subframe 1 and at frequency-domain positions of scheduled resources corresponding to Subframe 2.

When the UE is scheduled in the same RB or RE positions in Subframe 1 and Subframe 2, respectively, an LBT process can be performed in accordance with one of the following schemes.

Scheme 1: The UE performs an LBT process on one or more OFDM symbols before Subframe 1 and over the entire bandwidth in the frequency domain. Before Subframe 2, a full-bandwidth LBT process can be performed, or no LBT process may be performed.

Scheme 2: The UE performs an LBT process on one or more OFDM symbols before Subframe 1 and at frequency-domain positions of scheduled resources. Similarly, in the second subframe, an LBT process can be performed at frequency-domain positions of scheduled resources, or no LBT process may be performed.

When the UE is scheduled in the alternate RB or RE positions in Subframe 1 and Subframe 2, respectively, an LBT process can be performed in accordance with one of the following schemes.

Scheme 1: The UE performs an LBT process on one or more OFDM symbols before Subframe 1 and over the entire bandwidth in the frequency domain. Before Subframe 2, a full-bandwidth LBT process can be performed. Alternatively, an LBT process can be performed over frequency-domain resources corresponding to scheduled resources in the second scheduled subframe, or no LBT process may be performed.

Scheme 2: The UE performs an LBT process on one or more OFDM symbols before Subframe 1 and over a union of frequency-domain resources corresponding to two scheduled resources (e.g., for UE1, when the scheduled frequency-domain subframes in Subframe 1 are PRB #2-PRB #5 and the scheduled frequency-domain subframes in Subframe 2 are PRB #4-PRB #7, the frequency-domain positions at which the LBT process is performed before the first subframe are PRB #2-PRB #7). An LBT process can be performed before Subframe 2 and over frequency-domain resources corresponding to scheduled resources of the second scheduled subframe or over a union of the corresponding scheduled resources, or no LBT process may be performed.

Scheme 3: The UE performs an LBT process on one or more OFDM symbols before Subframe 1 and over respective scheduled resources in the frequency domain. An LBT process can be performed before Subframe 2 and at frequency-domain positions of scheduled resources corresponding to Subframe 2, or no LBT process may be performed.

Scheme 4: The UE performs an LBT process on one or more OFDM symbols before Subframe 1 and at frequency-domain positions of scheduled resources corresponding to Subframe 1. An LBT process can be performed on the last one or more symbols in Subframe 1 and at frequency-domain positions of scheduled resources corresponding to Subframe 2.

The above schemes also apply when different UEs are scheduled at the same, different or alternate resource positions in different subframes.

Further, regarding the LBT mechanism or LBT parameter set to be used when the same UE or different UEs are scheduled on a plurality of successive uplink subframes, reference can be made to the above Embodiment 10, where the LBT process is performed on different subframes in accordance with different scheduling schemes and situations of the plurality of successive subframes. Alternatively, the normal LBT Cat4 can be applied for the first uplink subframe and no LBT can be applied on the subsequent subframes. Alternatively, the normal LBT Cat4 can be applied for the first uplink subframe and contention-based access can be performed on the subsequent subframes with successively decreasing CWs. Alternatively, the normal LBT Cat4 can be applied for the first uplink subframe and the LBT Cat2 or the fast LBT mechanism can be applied on the subsequent subframes. Alternatively, the LBT Cat2 mechanism can be applied for the first uplink subframe and no LBT mechanism can be applied on the subsequent uplink subframes. Alternatively, the LBT Cat2 mechanism can be applied for the first uplink subframe and the LBT Cat2 mechanism, or no LBT mechanism, can be applied for the subsequent uplink subframes.

Embodiment 14

In this embodiment, a process will be described, in which respective different LBT mechanisms or LBT parameter sets are used for contention-based channel access before transmission for a plurality of successive uplink subframes in one uplink transmission burst.

In this embodiment, when all subframes are uplink subframes, the first uplink subframe is used as a position for applying the LBT mechanism or LBT mechanism parameter set before the second uplink subframe. For each of subsequent successive uplink subframes, the last OFDM symbol of the previous uplink subframe is used as a position for applying the LBT mechanism or LBT mechanism parameter set for that uplink subframe.

For a TDD frame structure, the subframe before a plurality of successive uplink subframes is a special subframe, S. In this case, the position for applying the LBT mechanism or LBT mechanism parameter set before transmission of the first uplink subframe can be the GP or UpPTS in the special subframe. For each of subsequent successive uplink subframes, the last OFDM symbol of the previous uplink subframe can be used as the position for performing LBT for that uplink subframe.

Here, the LBT process for the first uplink subframe may occupy a plurality of OFDM symbols, and the LBT process for each of the subsequent uplink subframes may occupy one or two OFDM symbols of its previous subframe. The same also applies to a structure having a flexible uplink-downlink frame ratio.

In the following, the LBT mechanisms or LBT mechanism parameter sets to be applied for transmission on a plurality of successive uplink subframes in accordance with different scheduling mechanisms will be explained in association with the scheduling mechanisms and different positions of uplink subframes.

For the same-carrier scheduling, a base station has applied the downlink LBT Cat4 mechanism before transmitting uplink scheduling grant information over an unlicensed carrier. Hence, when receiving the grant indication information, the UE can operate as follows before transmission of the first uplink subframe.

Scheme 1: When a slot length of a gap between an uplink transmission burst and a downlink transmission burst is a predetermined threshold, which can be 16 μs or 25 μs, the scheduled UE may apply no LBT mechanism before transmission of the first uplink subframe. However, this may lead to the hidden node problem.

Scheme 2: The scheduled UE may apply a fast LBT mechanism before transmission of the first uplink subframe. Here, the fast LBT mechanism can include the defer period+ECCA process; the direct ECCA process; the enhanced LBT Cat2; the LBT Cat2 and the simplified LBT Cat4 (having a CW smaller than the CW for the downlink LBT Cat4 and n in the defer period being configurable in [0, 2]). In this case, the fast LBT mechanism applied for the first uplink transmission can be one of the above fast LBT mechanisms.

Optionally, before transmission of each of a plurality of subsequent successive uplink subframes, a fast LBT mechanism can be applied on the last OFDM symbol of its previous subframe. Here, the fast LBT mechanism for the first uplink subframe and the fast LBT mechanism for the plurality of subsequent successive uplink subframes may be the same or different. Optionally, more simplified fast LBT mechanisms can be applied in turn (e.g., the defer period+ECCA process having CWmax=4 can be applied for the first uplink subframe; the direct ECCA process having e.g., CWmax≤4 can be applied for the second uplink subframe; and the enhanced LBT Cat2 can be applied for the third uplink subframe). Optionally, a fast LBT mechanism can be applied for the first uplink subframe and the same LBT mechanism can be applied for each of the plurality of subsequent successive uplink subframes. In a special case, a fast LBT mechanism can be applied for the first uplink subframe and no LBT mechanism can be applied for the plurality of subsequent successive uplink subframes. The above process for the same-carrier scheduling is provided to share a fair opportunity of contention-based channel access with a Wi-Fi system. A node in the Wi-Fi system only needs to apply a mechanism similar to the downlink LBT Cat4 mechanism once before data transmission, with CWmax=1024. Hence, for the same-carrier scheduling, since the base station has applied the downlink LBT Cat4 mechanism once before transmitting the uplink grant information, in order not to put the LAA system in a disadvantageous position for contention-based access, the UE only applies one fast LBT mechanism before uplink transmission, so as to allow the UE to access the channel at a higher probability or access the channel fast for transmission.

For the cross-carrier scheduling, two aspects will be described regarding different LBT mechanisms or LBT parameter sets to be applied for different uplink subframes when a plurality of uplink subframes is to be transmitted.

When the uplink grant information is transmitted over a licensed carrier and no downlink data is to be transmitted, after receiving the uplink grant information, the UE can apply a normal LBT Cat4 mechanism on a plurality of OFDM symbols before the first uplink subframe, so as to ensure a relatively fair opportunity for the Wi-Fi system to access the channel. Here, the normal LBT Cat4 mechanism has a CW larger than the CW for the downlink LBT Cat4 mechanism and optionally larger than the CW for the same-carrier mechanism. The position of applying LBT for each of the plurality of subsequent successive uplink subframes is at the last OFDM symbol of the previous subframe, with LBT Cat4 mechanisms having successively decreasing CW sizes (the CW sizes are selected such that the LBT processes can be finished within one OFDM symbol). Optionally, a fast LBT mechanism can be applied for the transmission on the subsequent uplink subframes. Further, for the subsequent uplink subframes, the same or different LBT mechanisms or LBT parameter sets can be used. Optionally, for a plurality of successive uplink subframes subsequent to the first uplink subframe in one transmission burst, no LBT can be applied for transmission.

When the uplink grant information is transmitted over a licensed carrier and there is downlink data to be transmitted, the base station needs to apply the downlink LBT Cat4 mechanism over an unlicensed carrier for channel access, so as to transmit the downlink data. After receiving the uplink grant information, the UE can perform an LBT process on a plurality of OFDM symbols before the first uplink subframe, as in the same-carrier scheduling case described above. In a special case, when a time-domain length of a gap between an uplink transmission burst and a downlink transmission burst is smaller than a predetermined threshold, which can be 16 μs or 25 μs, the scheduled UE may apply no LBT mechanism before transmission of the first uplink subframe.

For the subsequent uplink subframes, no LBT mechanism, or a fast LBT mechanism such as LBT Cat2, can be applied.

Moreover, in order for the UE to learn the index of the uplink subframe it is on in the burst and/or whether the LBT for the previous subframe has succeeded, the UE can be so notified in accordance with the following schemes.

For a fixed frame structure, the UE can know on which uplink subframe it is scheduled. Thus, the UE can determine which LBT mechanisms or parameter sets to be used for different subframes in a default scheme, which can be the above schemes for same-carrier scheduling or cross-carrier scheduling as described above in this embodiment. For example, in the above embodiment, it is determined to use the normal LBT Cat4 mechanism for the cross-carrier scheduling and the fast LBT mechanism for the same-carrier scheduling, before transmission of the first uplink subframe. Before transmission of the subsequent uplink subframes, LBT Cat4 mechanisms having successively decreasing CW sizes (the selection of CW sizes is limited to the number of OFDM symbols available for performing LBT processes) can be applied for the cross-carrier scheduling and a fast LBT mechanism can be applied for the same-carrier scheduling.

For a flexible uplink/downlink subframe structure, there are two schemes for notifying the UE of the index of the uplink subframe on which it is scheduled in one transmission burst or determining the LBT mechanism and/or LBT mechanism parameter set to be applied.

Scheme 1: The base station can notify the UE explicitly via an indication message whether the scheduled subframe is the first subframe or a subframe that is a particular number of subframes behind the first subframe.

Scheme 2: The base station can indicate to the UE via dynamic DCI the LBT mechanism or LBT mechanism parameter set to be applied on the scheduled subframe.

Alternatively, the notification can be carried out via an RRC message.

When the UE scheduled on the first uplink subframe has filed in the LBT process in accordance with the LBT mechanism or parameter set, in the next subframe, the UE can use the same mechanism or parameter set as that for the first uplink subframe to perform an LBT process. Alternatively, the UE can perform apply the LBT mechanism or LBT mechanism parameter set based on the position of the subframe it is on, or perform channel access using a configured, signaled or default LBT mechanism or LBT mechanism parameter set. In this case, UEs can notify each other whether their LBT processes have succeeded, or indicate whether to use the original LBT mechanism or LBT mechanism parameter set for channel access or not. Optionally, when the UE has failed for a number of times in channel access in accordance with the configured LBT mechanism or LBT mechanism parameter set, it can dynamically adjust a priority or the LBT mechanism or parameter set based on an indication signaled by a base station, a measurement of feedback information, a measurement of interference condition, or a priority of a transmitted channel, a transmitted signal, a transmitted logical channel, or a type of transmitted traffic (e.g., to raise the priority, so as to perform channel access in accordance with the LBT mechanism or LBT parameter set corresponding to a higher priority, or perform channel access in accordance with an LBT mechanism or parameter set having a higher probability of channel access than the current LBT mechanism or parameter set, so as to provide the UE with a better opportunity in channel access).

In the above embodiment of the present disclosure, the related indication information can include: a size of data packet to be transmitted, a number of successive scheduled subframes, one or more bits configured in DCI signaling, a broadcast scheme, a time-domain length of a gap between an uplink transmission burst and a downlink transmission burst, an identity in an LBT list signaled from a base station, a position of a scheduled subframe in a transmission burst or in successive uplink subframes, a length of one transmission burst, and/or a carrier scenario for transmission of a scheduling instruction. The priority information can include: a QoS priority for a traffic type, or a priority of a channel, a signal and/or a logical channel. Optionally, logical channels having different priority levels can be mapped to corresponding physical transmission channels, such that the physical transmission channels also have the respective priority levels. The methods for determining the LBT mechanism or LBT mechanism parameter set can be combined, provided that they do not conflict. Also, each of these methods can be applied individually for determining the LBT parameter or LBT mechanism.

While the embodiments of the present disclosure have been described above, the foregoing is only embodiments (e.g., specific implementations in the embodiments) for illustrating, rather than limiting, the present disclosure. Various modifications and alternatives in forms and details can be made by those skilled in the art without departing from the spirit and scope of the present disclosure. The scope of the present disclosure is defined only by the claims as attached.

What is claimed is:

1. A method for wireless communication, comprising:
receiving, at a user device, a signaling message from a base station, wherein the signaling message indicates a number of scheduled subframes for the user device to perform an uplink transmission after accessing a channel in an unlicensed spectrum;
accessing, by the user device, the channel without a random back-off in one or more of the number of scheduled subframes using a type 2 mechanism in which an assessment of whether a channel is idle is performed; and
accessing, upon determining a failure to access the channel in a first subframe of the one or more subframes, the channel in a second subframe next to the first subframe using an access mechanism according to a single bit in the signaling message to perform the uplink transmission.

2. The method of claim 1, wherein the assessment of whether the channel is idle using the type 2 mechanism is performed in a unit of 25 μs.

3. A method of wireless communication, comprising:
transmitting, from a base station, a signaling message to a user device, wherein the signaling message indicates a number of scheduled subframes for the user device to perform an uplink transmission after accessing a channel in an unlicensed spectrum; and
indicating, to the user device, using a single bit in the signaling message, an access mechanism for accessing the channel in the unlicensed spectrum in a second subframe next to a first subframe of the number of scheduled subframes in which the user device fails to access the channel, wherein the user device is enabled to access the channel without random back-off using a type 2 mechanism in which an assessment of whether the channel is idle is performed, and wherein the access mechanism indicated by the single bit in the signaling message is applied on a plurality of subsequent subframes starting at the second subframe.

4. The method of claim 3, wherein the assessment of whether the channel is idle using the type 2 mechanism is performed in a unit of 25 µs.

5. An apparatus for wireless communication, comprising:
a processor; and
a memory including processor executable code, wherein the processor executable code upon execution by the processor configures the processor to:
receive a signaling message from a base station, wherein the signaling message indicates a number scheduled subframes to perform an uplink transmission after accessing a channel in an unlicensed spectrum;
access the channel without a random back-off in one or more of the number of scheduled subframes using a type 2 mechanism in which an assessment of whether a channel is idle is performed; and
access, upon determining a failure to access the channel in a first subframe of the one or more subframes, the channel in a second subframe next to the first subframe using an access mechanism according to a single bit in the signaling message to perform the uplink transmission.

6. The apparatus of claim 5, wherein the assessment of whether the channel is idle using the type 2 mechanism is performed in a unit of 25 µs.

7. An apparatus for wireless communication, comprising:
a processor; and
a memory including processor executable code, wherein the processor executable code upon execution by the processor configures the processor to:
transmit a signaling message to a user device, wherein the signaling message indicates a number of scheduled subframes for the user device to perform an uplink transmission after accessing a channel in an unlicensed spectrum; and
indicate, using a single bit in the signaling message, an access mechanism for accessing the channel in the unlicensed spectrum in a second subframe next to a first subframe of the number of scheduled subframes in which the user device fails to access the channel, wherein the user device is enabled to access the channel without random back-off using a type 2 mechanism in which an assessment of whether the channel is idle is performed, and wherein the access mechanism indicated by the single bit in the signaling message is applied on a plurality of subsequent subframes starting at the second subframe.

8. The apparatus of claim 7, wherein the assessment of whether the channel is idle using the type 2 mechanism is performed in a unit of 25 µs.

9. A non-transitory computer-readable medium having code stored thereon, the code, when executed, causing a processor to:
receive a signaling message from a base station, wherein the signaling message indicates a number scheduled subframes to perform an uplink transmission after accessing a channel in an unlicensed spectrum;
access the channel without a random back-off in one or more of the number of scheduled subframes using a type 2 mechanism in which an assessment of whether a channel is idle is performed; and
access, upon determining a failure to access the channel in a first subframe of the one or more subframes, the channel in a second subframe next to the first subframe using an access mechanism according to a single bit in the signaling message to perform the uplink transmission.

10. The non-transitory computer-readable medium of claim 9, wherein the assessment of whether the channel is idle using the type 2 mechanism is performed in a unit of 25 µs.

11. A non-transitory computer-readable medium having code stored thereon, the code, when executed, causing a processor to:
transmit a signaling message to a user device, wherein the signaling message indicates a number of scheduled subframes for the user device to perform an uplink transmission after accessing a channel in an unlicensed spectrum; and
indicate, using a single bit in the signaling message, an access mechanism for accessing the channel in the unlicensed spectrum in a second subframe next to a first subframe of the number of scheduled subframes in which the user device fails to access the channel, wherein the user device is enabled to access the channel without random back-off using a type 2 mechanism in which an assessment of whether the channel is idle is performed, and wherein the access mechanism indicated by the single bit in the signaling message is applied on a plurality of subsequent subframes starting at the second subframe.

12. The non-transitory computer-readable medium of claim 11, wherein the assessment of whether the channel is idle using the type 2 mechanism is performed in a unit of 25 µs.

* * * * *

UNITED STATES PATENT AND TRADEMARK OFFICE
CERTIFICATE OF CORRECTION

PATENT NO. : 11,277,864 B2
APPLICATION NO. : 16/877465
DATED : March 15, 2022
INVENTOR(S) : Yang et al.

Page 1 of 2

It is certified that error appears in the above-identified patent and that said Letters Patent is hereby corrected as shown below:

In the Specification

In Column 1, Line 10, delete "2018," and insert -- 2018, now Pat. No. 10,660,127, --, therefor.

In Column 1, Line 62, delete "LTE-U" and insert -- LTE-UE --, therefor.

In Column 4, Line 17, delete "of for" and insert -- of --, therefor.

In Column 6, Lines 16-17, delete "LBT . . . retransmission." and insert the same at Line 15, after "and/or" as a continuation paragraph.

In Column 13, Lines 16-19, delete "Division Multiplexing. . . . uplink subframe." and insert the same at Line 15, after "Frequency" as a continuation paragraph.

In Column 19, Lines 55-60, delete "LBT mechanism . . . access; or" and insert the same at Line 54, after "and/or" as a continuation paragraph.

In Column 19, Line 61, delete "note" and insert -- noted --, therefor.

In Column 24, Lines 63-64, delete "LBT mechanisms . . . sets; and" and insert the same at Line 62, after "respective" as a continuation paragraph.

In Column 31, Line 1, delete "LAAUE" and insert -- LAA UE --, therefor.

In Column 31, Line 19, delete "LAAUE" and insert -- LAA UE --, therefor.

In Column 31, Line 45, delete "LAAUE" and insert -- LAA UE --, therefor.

In Column 32, Line 9, delete "LAAUE" and insert -- LAA UE --, therefor.

Signed and Sealed this
Ninth Day of August, 2022

Katherine Kelly Vidal
*Director of the United States Patent and Trademark Office*

CERTIFICATE OF CORRECTION (continued)
U.S. Pat. No. 11,277,864 B2

In Column 32, Line 12, delete "LAAUE" and insert -- LAA UE --, therefor.

In Column 32, Line 16, delete "LAAUE" and insert -- LAA UE --, therefor.

In Column 32, Lines 30-41, delete "Cat4 mechanisms . . . following manner:" and insert the same at Line 29, after "LBT" as a continuation paragraph.

In Column 32, Line 43, delete "LAAUE" and insert -- LAA UE --, therefor.

In Column 33, Line 1, delete "(0-8)"and insert -- (0~8) --, therefor.

In Column 48, Line 22, delete "embodiments)" and insert -- embodiments), --, therefor.

In the Claims

In Column 50, Line 8, in Claim 9, delete "number" and insert -- number of --, therefor.